United States Patent
El Badawi et al.

(10) Patent No.: US 10,898,865 B2
(45) Date of Patent: Jan. 26, 2021

(54) POLYMER-CARBON NANOTUBE NANOCOMPOSITE POROUS MEMBRANES

(71) Applicants: Nouran Ashraf Abdel Hamied El Badawi, Cairo (EG); Amal Mohamed Kamal Esawi, Giza (EG); Adham Ramzy Ramadan, Cairo (EG)

(72) Inventors: Nouran Ashraf Abdel Hamied El Badawi, Cairo (EG); Amal Mohamed Kamal Esawi, Giza (EG); Adham Ramzy Ramadan, Cairo (EG)

(73) Assignee: AMERICAN UNIVERSITY IN CAIRO (AUC), New Cairo (EG)

( * ) Notice: Subject to any disclaimer, the term of this patent is extended or adjusted under 35 U.S.C. 154(b) by 266 days.

(21) Appl. No.: 13/755,731

(22) Filed: Jan. 31, 2013

(65) Prior Publication Data
US 2014/0209539 A1    Jul. 31, 2014

(51) Int. Cl.
*B01D 71/16* (2006.01)
*B82Y 30/00* (2011.01)
(Continued)

(52) U.S. Cl.
CPC ........... *B01D 71/16* (2013.01); *B01D 69/148* (2013.01); *B82Y 30/00* (2013.01); *B01D 71/021* (2013.01);
(Continued)

(58) Field of Classification Search
CPC .. B01D 61/025; B01D 61/027; B01D 61/145; B01D 61/002; B01D 71/16; B01D 71/68;
(Continued)

(56) References Cited

U.S. PATENT DOCUMENTS 3,026,571 A * 3/1962 Maier ................ F28F 3/083
                                                    264/218
3,497,072 A * 2/1970 Cannon .................. B01D 69/02
                                                    106/171.1
(Continued)

FOREIGN PATENT DOCUMENTS

EP           357369 B1 * 5/1993
EP         0357369 B1 * 5/1993      ........... A61K 9/0004
(Continued)

OTHER PUBLICATIONS

Li et al. Cellulose Acetate/Multiwalled Carbon Nanotube Nanocomposites with Improved Mechanical, Thermal, and Electrical Properties, 118 J. Appl. Polym. Sci. 2475, 2475-2481 (2010).*
(Continued)

*Primary Examiner* — Krishnan S Menon
*Assistant Examiner* — Brad Gordon
(74) *Attorney, Agent, or Firm* — Oblon, McClelland, Maier & Neustadt, L.L.P.

(57) ABSTRACT

This invention relates to an asymmetric composite membrane containing a polymeric matrix and carbon nanotubes within a single membrane layer, where the carbon nanotubes are randomly oriented within the polymeric matrix and the composite membrane is formed by phase inversion. This invention also relates to a method for producing the composite membrane which includes: coating a surface with a film of a polymer solution containing a polymeric matrix and carbon nanotubes dissolved in at least one solvent; immersing the coated surface in a non-solvent to affect solvent/non-solvent demixing resulting in phase inversion to form a carbon nanotube-containing membrane; and optionally, removing the carbon nanotube-containing membrane from the surface. The invention also relates to a desalination method using the composite membrane.

13 Claims, 12 Drawing Sheets

(51) Int. Cl.
*B01D 69/14* (2006.01)
*C02F 1/44* (2006.01)
*B01D 71/02* (2006.01)

(52) U.S. Cl.
CPC ............ *C02F 1/44* (2013.01); *C02F 2305/08* (2013.01); *Y02A 20/131* (2018.01)

(58) Field of Classification Search
CPC ...... B01D 71/56; B01D 69/12; B01D 69/148; B01D 69/10; B01D 67/0093; B01D 2325/022; B82Y 30/00; C02F 1/442; C02F 1/441; C02F 1/444; C02F 1/445; C02F 2305/08; C02F 3/1268
USPC .. 210/490, 500.27, 500.41, 502.1, 650, 651, 210/500.38, 500.21, 500.3, 652, 50.31; 977/750, 902, 778, 742, 752, 903, 962; 427/244, 389.9
See application file for complete search history.

(56) References Cited

U.S. PATENT DOCUMENTS

| | | | | |
|---|---|---|---|---|
| 3,620,970 | A * | 11/1971 | Klug ................ | B01D 67/0093 210/500.23 |
| 4,604,204 | A * | 8/1986 | Linder ................ | B01D 71/16 210/490 |
| 4,814,082 | A * | 3/1989 | Wrasidlo ............ | B01D 67/0093 210/490 |
| 4,840,733 | A * | 6/1989 | Sasaki ................ | B01D 67/0009 210/500.41 |
| 4,900,334 | A * | 2/1990 | Admassu ............ | B01D 67/0083 95/54 |
| 5,181,940 | A * | 1/1993 | Bikson ................ | B01D 53/22 95/47 |
| 5,480,554 | A * | 1/1996 | Degen ................ | B01D 65/102 210/500.41 |
| 6,146,747 | A * | 11/2000 | Wang ................ | B01D 39/083 210/490 |
| 2008/0290020 | A1* | 11/2008 | Marand ............... | B01D 53/228 210/500.27 |
| 2009/0001009 | A1* | 1/2009 | Linder ............... | B01D 67/0079 210/243 |
| 2009/0078640 | A1* | 3/2009 | Chu ................ | B01D 67/0013 210/321.6 |
| 2009/0178969 | A1* | 7/2009 | Hanakawa .......... | B01D 67/0006 210/321.6 |
| 2010/0206811 | A1* | 8/2010 | Ng ..................... | B01D 67/0011 210/654 |
| 2011/0220574 | A1* | 9/2011 | Bakajin ................ | B01D 53/228 210/650 |
| 2011/0240556 | A1* | 10/2011 | Hoek ..................... | B01D 71/58 210/650 |
| 2012/0080381 | A1* | 4/2012 | Wang ..................... | C09D 7/70 210/654 |
| 2013/0095241 | A1* | 4/2013 | Lulevich ................ | B29C 57/10 427/243 |
| 2013/0098833 | A1* | 4/2013 | Sun ..................... | B01D 61/002 210/500.25 |
| 2013/0284669 | A1* | 10/2013 | Kozlov ................ | B01D 71/56 210/636 |

FOREIGN PATENT DOCUMENTS

WO    WO 2011123780 A1 * 10/2011 ............ B01D 71/06
WO    WO-2011133116 A1 * 10/2011 ............ B01D 61/002

OTHER PUBLICATIONS

Gethard et al., Water Desalination using Carbon-Nanotube-Enhanced Membrane Distillation, 3 Appl. Mater. Interfaces 110, 110-114 (2011).*

Geise et al., Water Permeability and Water/Salt Selectivity Tradeoff in Polymers for Desalination, 369 J. Membr. Sci. 130, 132 (2011).*

Kim et al., Poly(imide siloxane) and Carbon Nanotube Mixed Matrix Membranes for Gas Separation, 192 Desalination 330, 330-339 (2006).*

Vogrin et al., The Wet Phase Separation: The Effect of Cast Solution Thickness on the Appearance of Macrovoids in the Membrane Forming Ternary Cellulose Acetate/Water System, 207 J. Membrane Sci. 139, 139-141 (2002).*

Choi et al., Fabrication and Characterization of Multi-Walled Carbon Nanotubes/Polmer Blend Membranes, 284 J. Membrane Sci. 406, 406-415 (2006).*

Ashraf et al., Carbon Nanotubes-Cellulose Acetate Nanocomposites, The American University in Cairo (2012).*

Choi et al., Fabrication and Characterization of Multi-Walled Carbon Nanotubes/Polmer Blend Membranes, 284 J. Membrane Sci. 406, 406-415 (2006) (Year: 2006).*

Ashraf et al., Carbon Nanotubes-Cellulose Acetate Nanocomposites, The American University in Cairo (2012). (Year: 2012).*

* cited by examiner

Fig. 1: Graph showing the effect of MWCNTs onto the CA membrane permeation rates
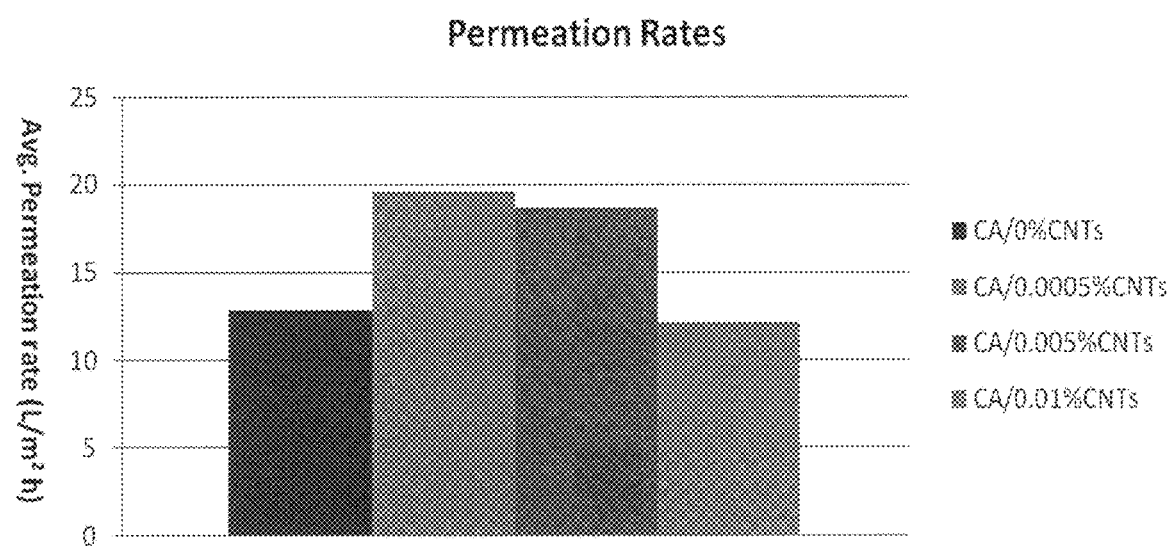

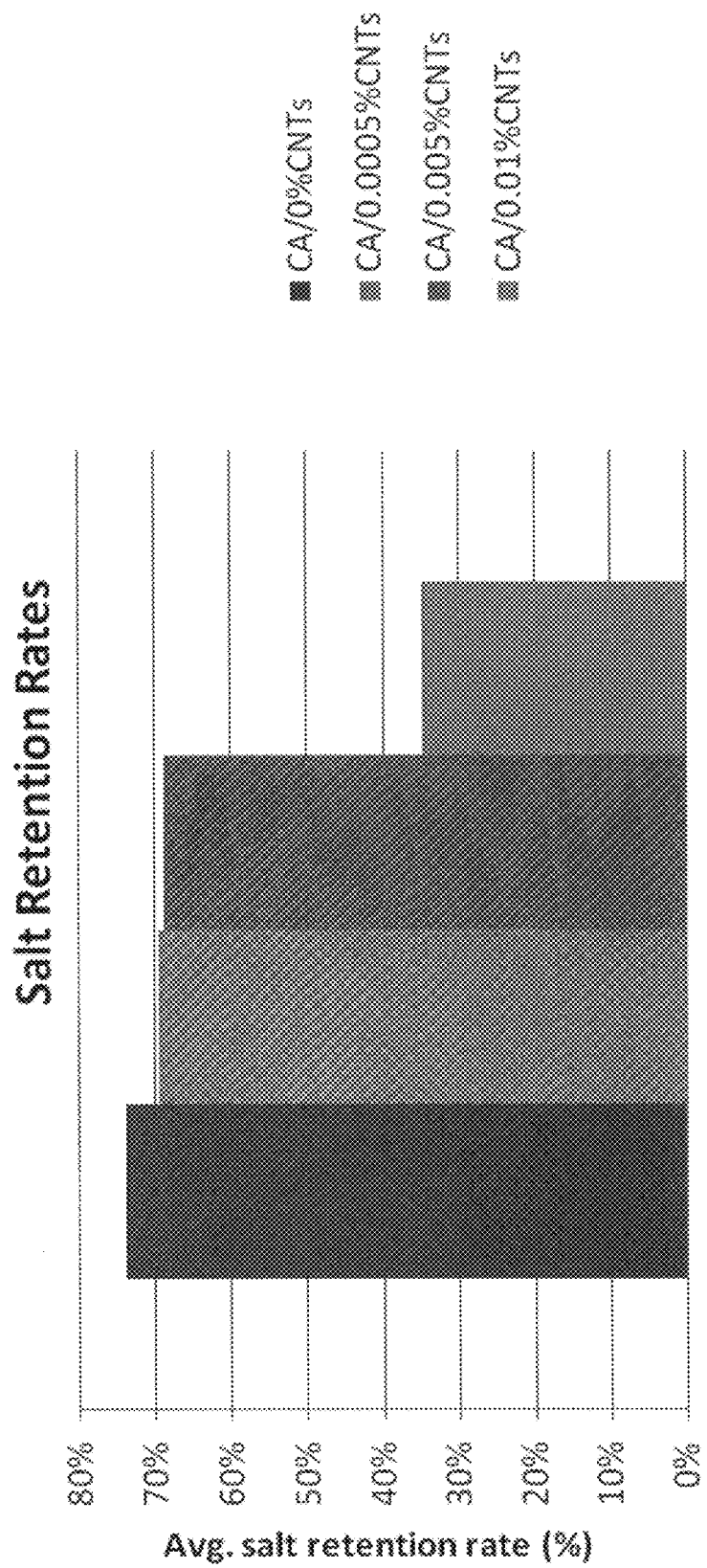

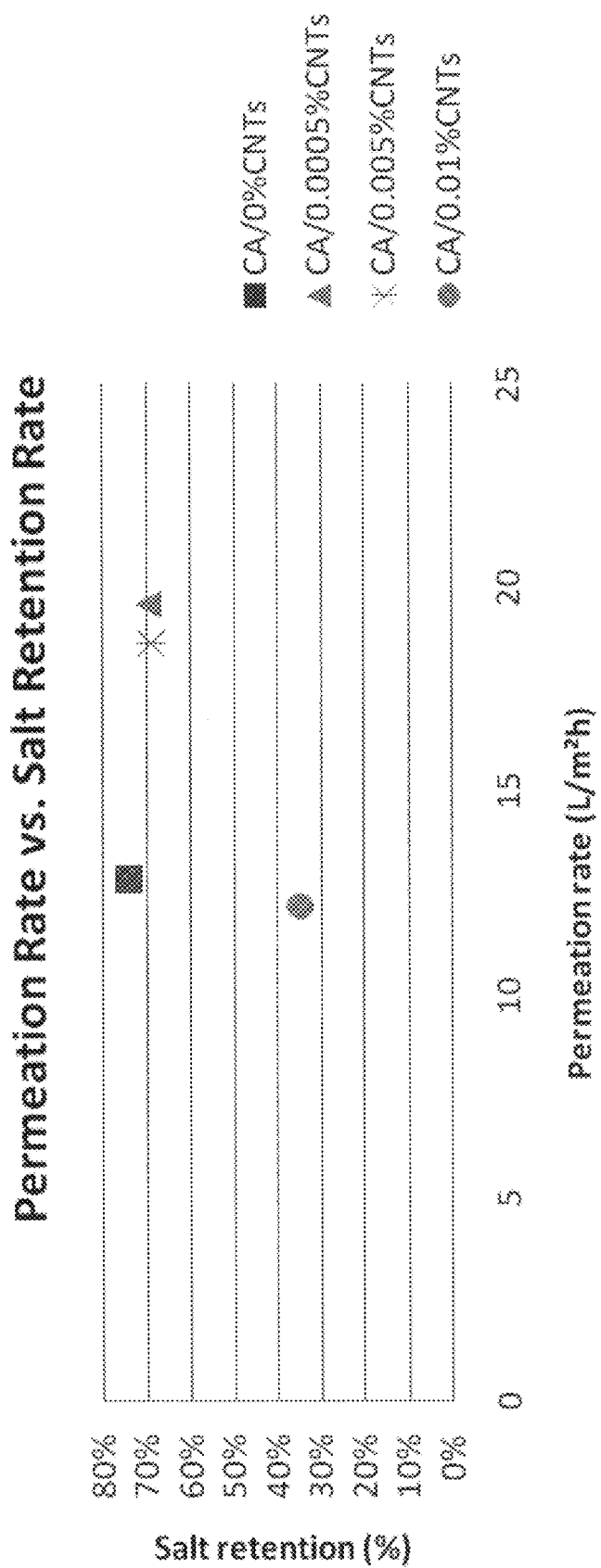
Fig. 3: Representation of the effect of functionalized MWCNTs addition on the membrane overall performance

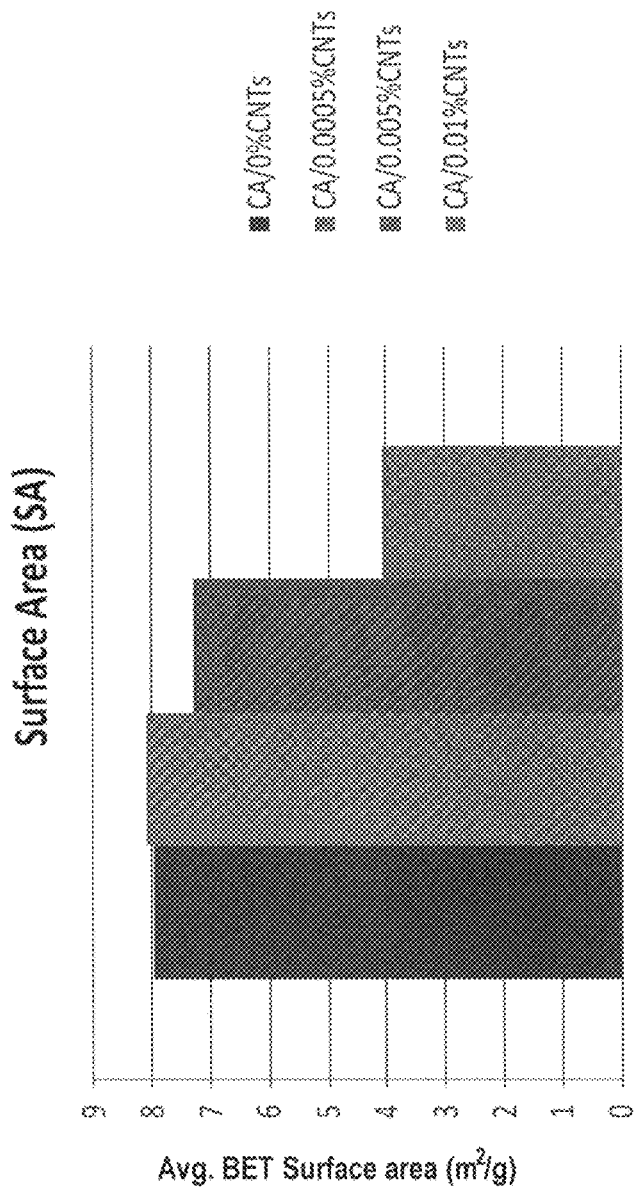

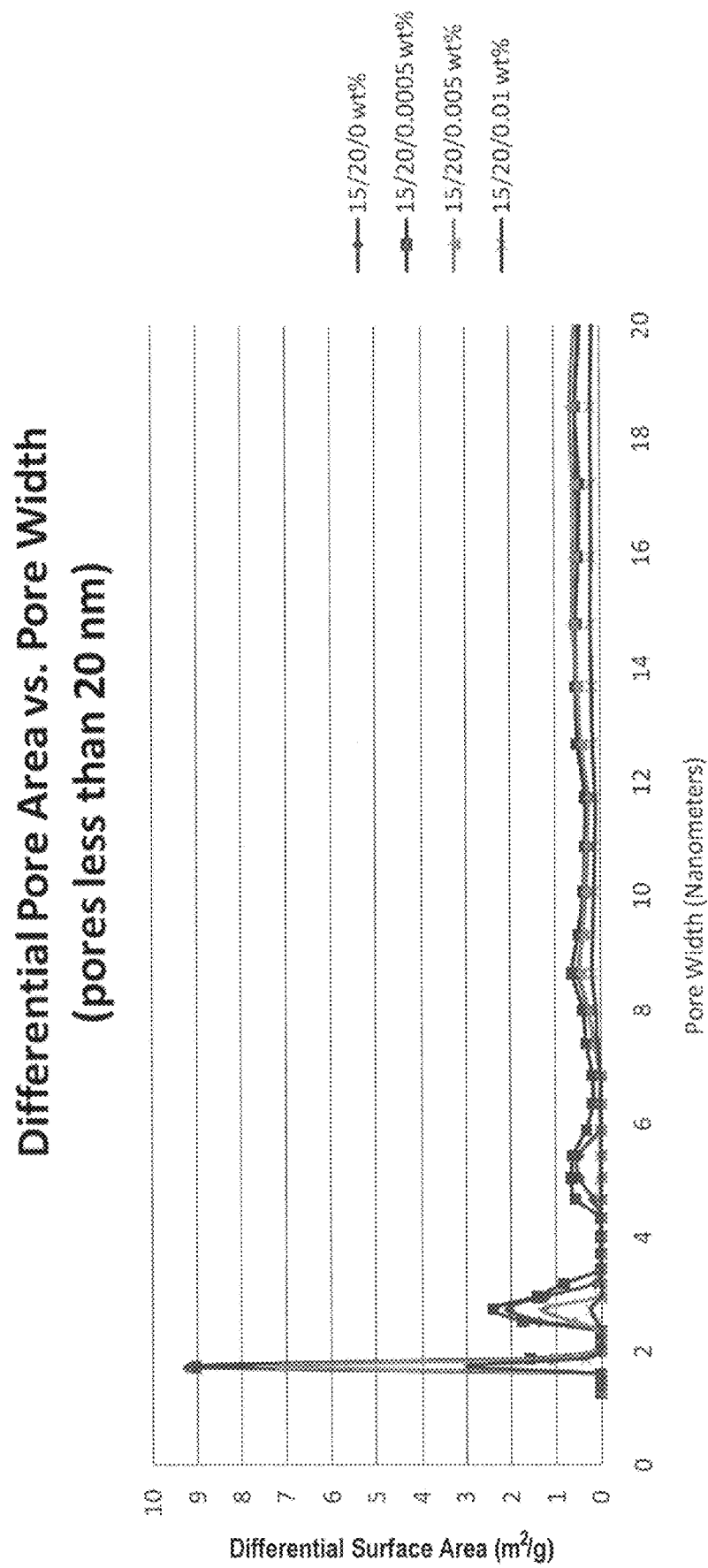

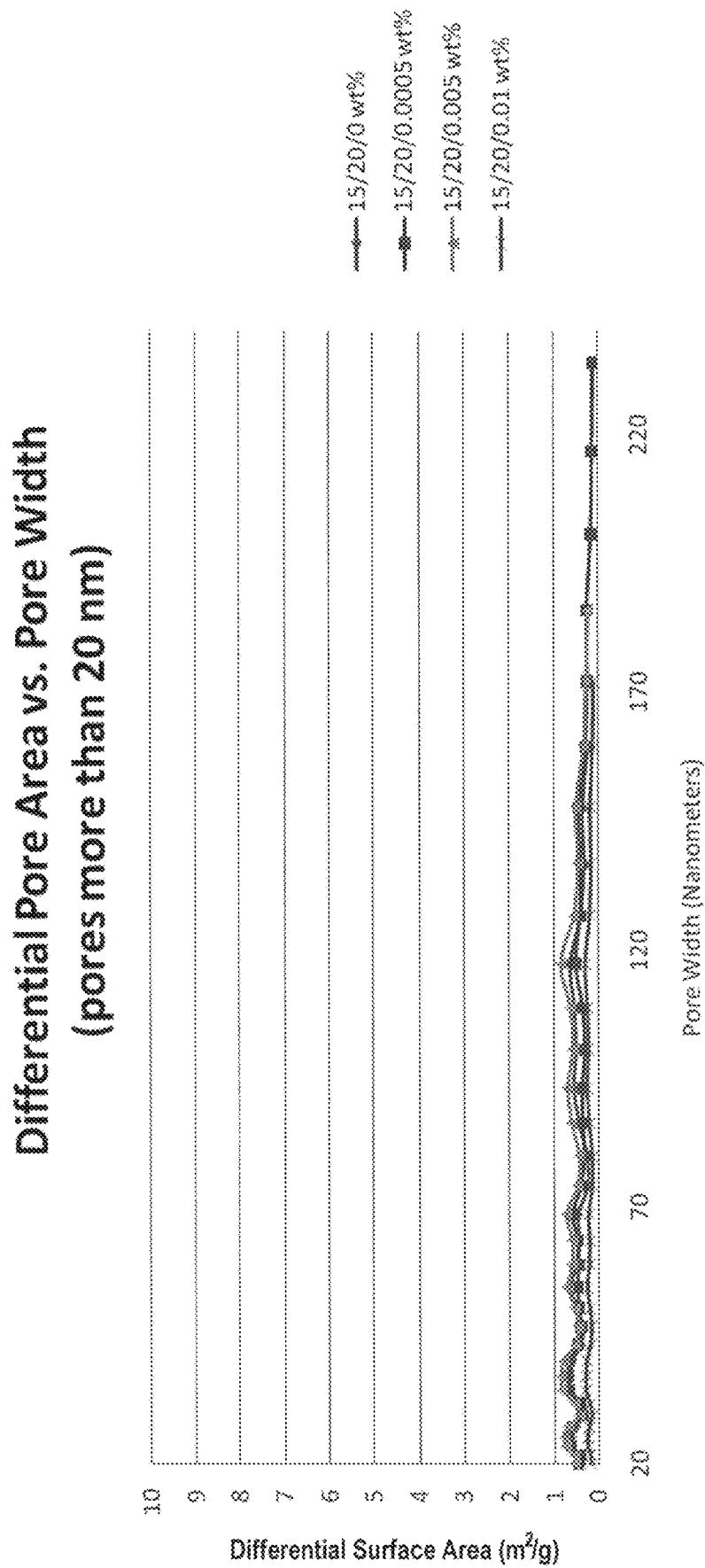

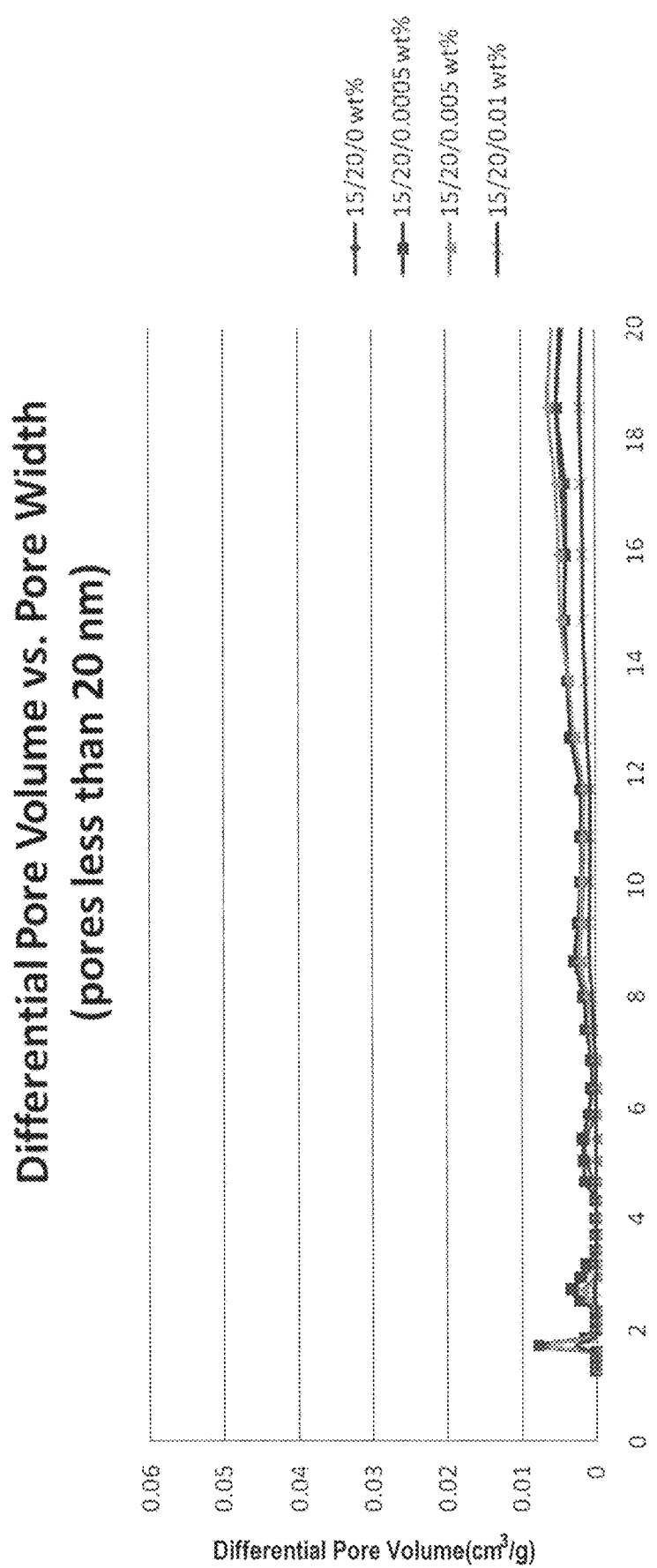
Fig. 6A: Graph of differential pore volume versus pore widths of less than or equal to 20 nm.

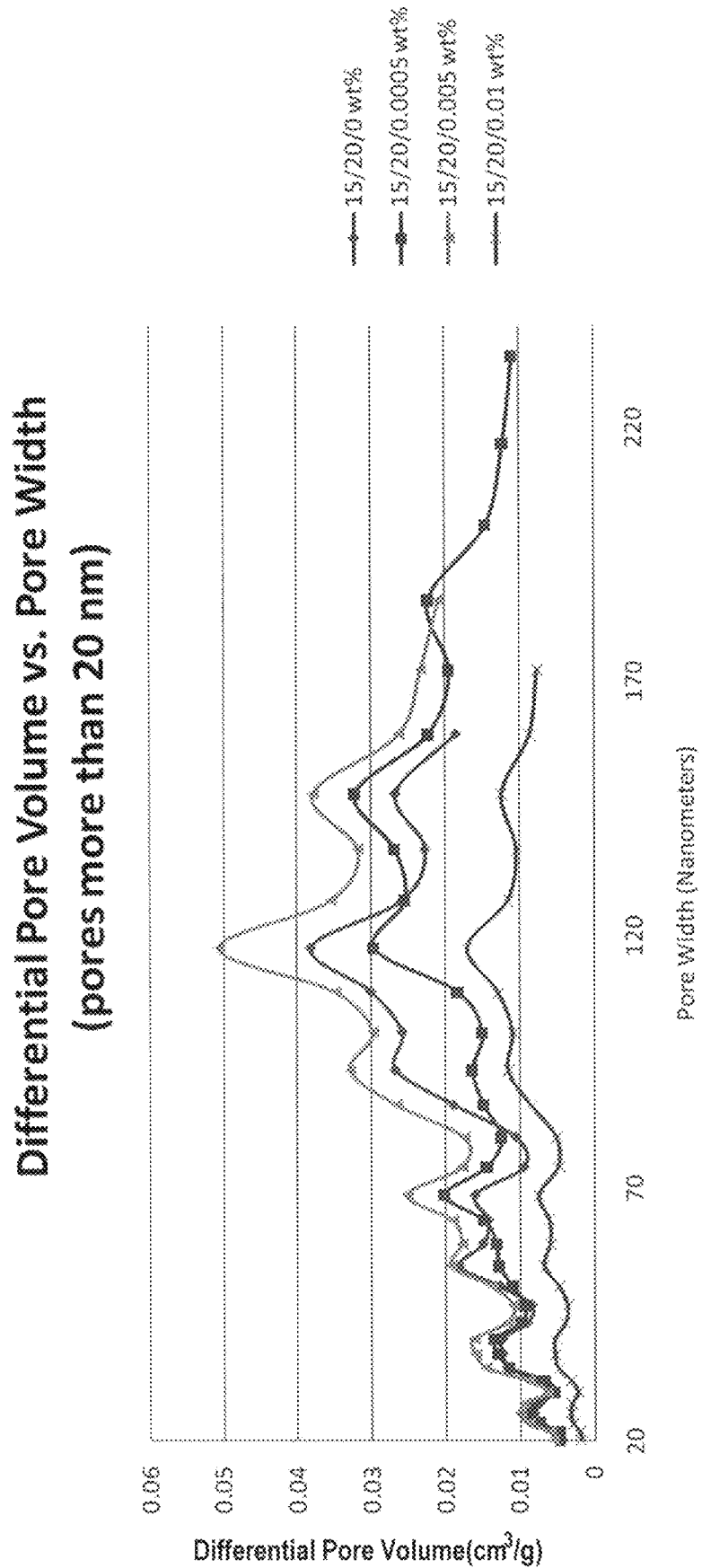

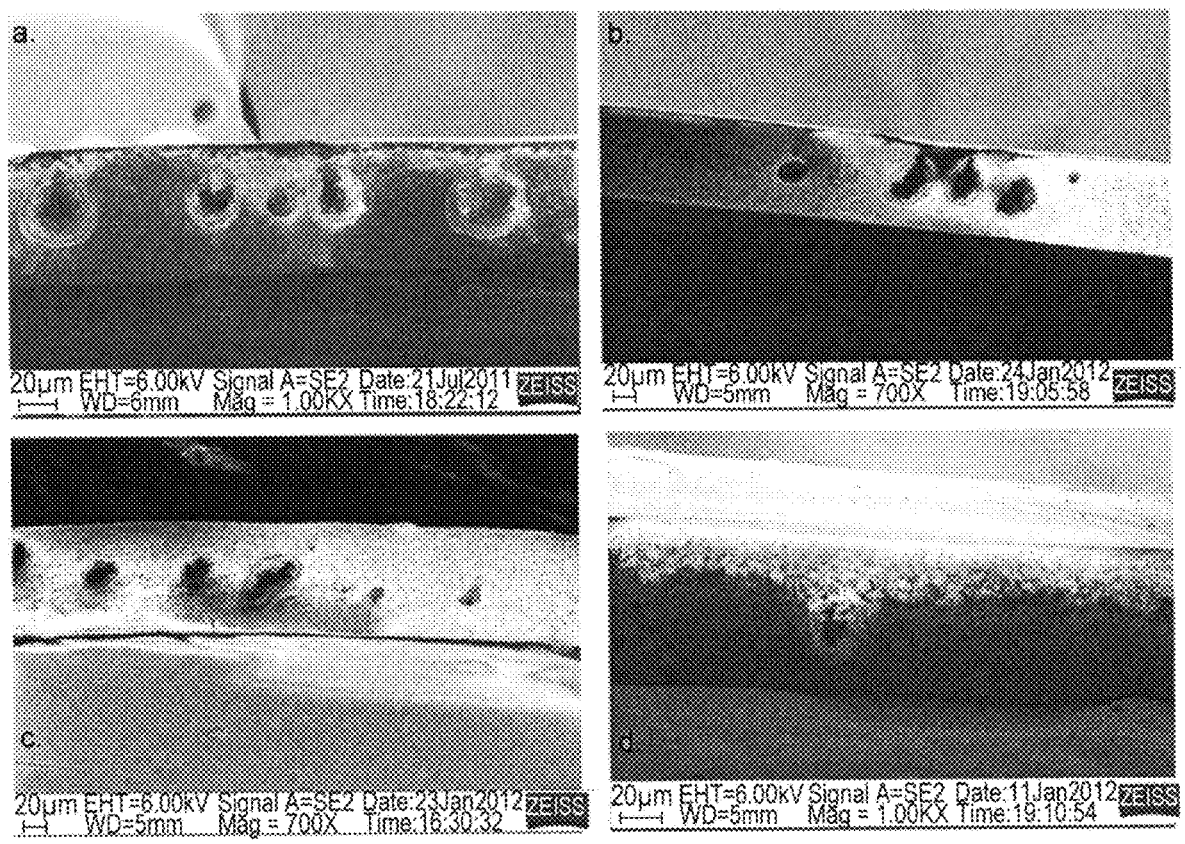
Fig. 7: SEM images showing the change in morphology due to MWCNTs addition; a. blank CA/0%CNT; b.CA/0.0005%CNT; c.CA/0.005%CNT; d.CA/0.01%CNT

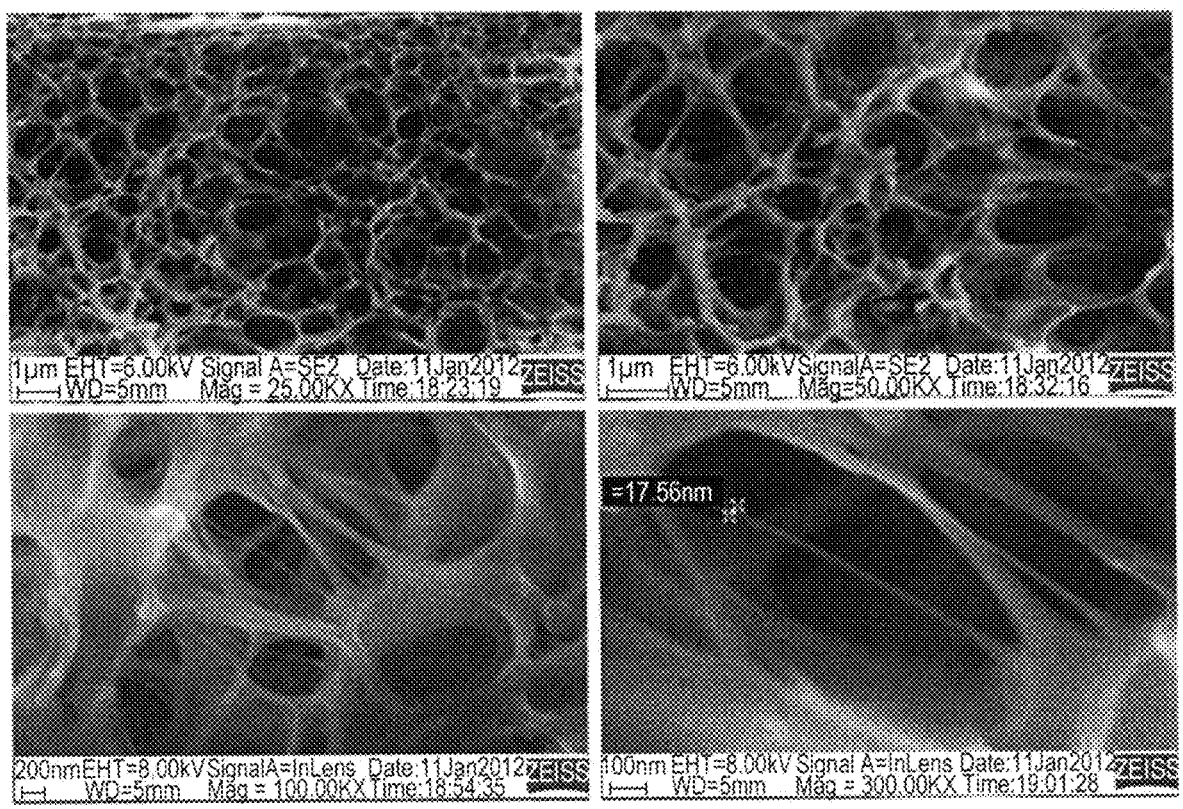
Fig. 8: MWCNTs networks in CA/0.01%CNT nanocomposite at different SEM magnifications

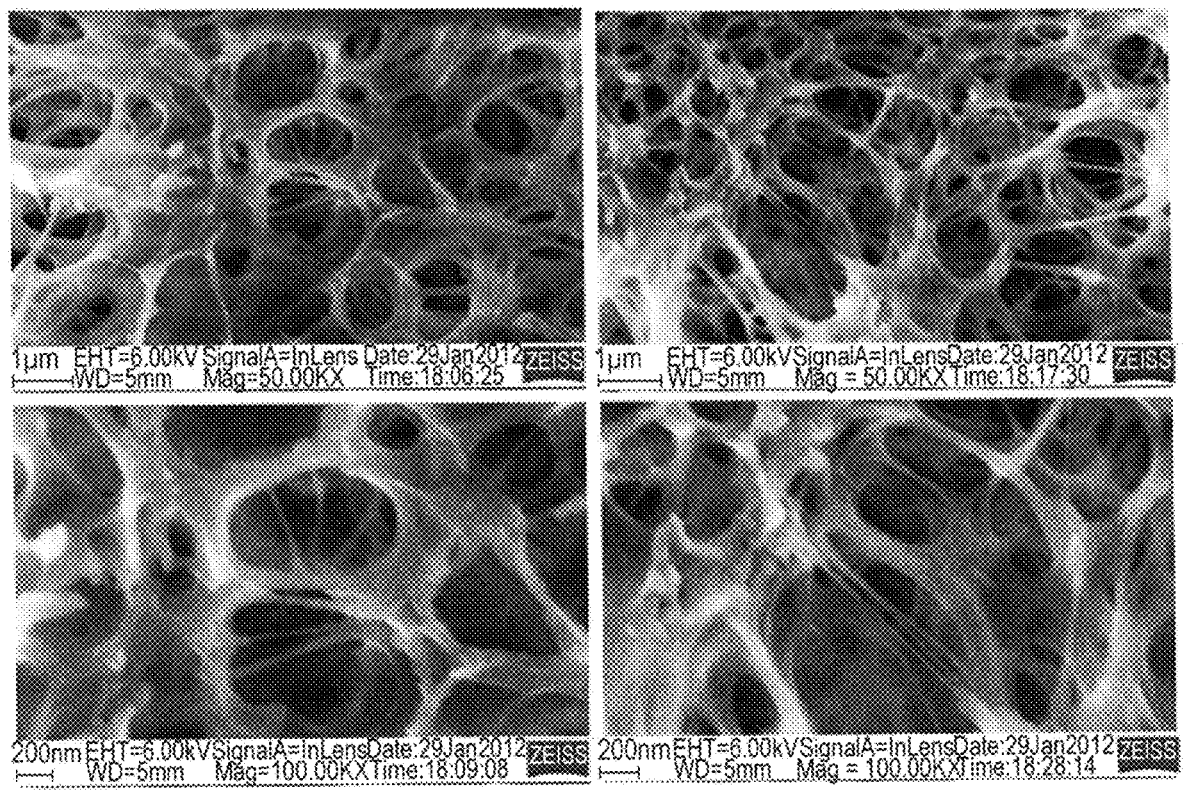
Fig. 9: MWCNTs networks in CA/0.005%CNT nanocomposite at different SEM magnifications

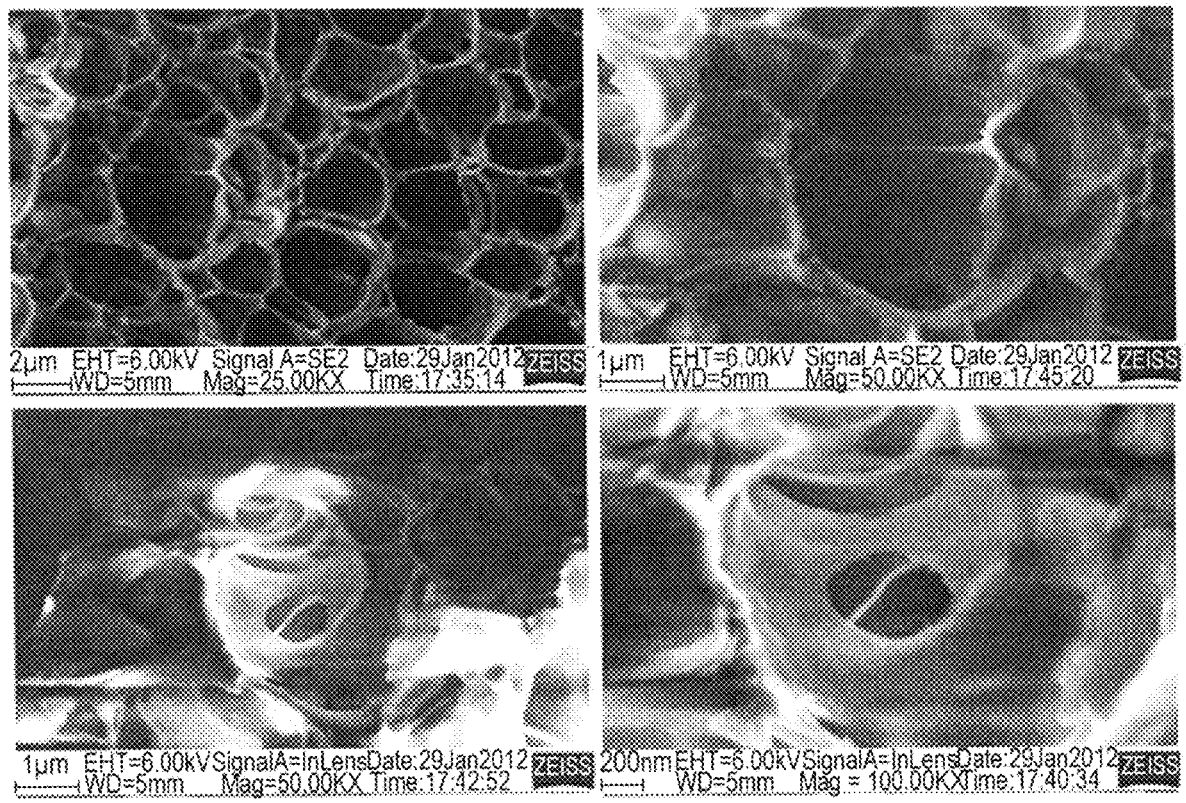
Fig. 10: MWCNTs networks in CA/0.0005%CNT nanocomposite at different SEM magnifications

POLYMER-CARBON NANOTUBE NANOCOMPOSITE POROUS MEMBRANES

BACKGROUND OF THE INVENTION

1. Field of the Invention

This invention relates to novel polymer-carbon nanotube (functionalized) asymmetric porous membranes for use, by example, in water filtration/desalination applications.

2. Background Relating to the Problem

Membranes find utility in a wide variety of applications including, for example, water desalination, water demineralization, gas separation (including removal of hydrocarbons, carbon dioxide sequestration), dialysis, and in breathable materials for protection against chemical and biological agents. Recently, nanocomposites have been shown to be useful materials in the fabrication of membranes.

A nanocomposite is a synthesized material produced by mixing two or more components, which are different in their physical and/or chemical properties, to give a final structure with a preserved phase difference between its constituents. One or more of those components, called a nanofiller, is an inorganic material having one or more of its dimensions (length, width, and/or thickness) on the nanoscale (i.e., ranging in size, for example, from 1 to 100 nm). When integrated into a matrix, in which the nanocomposite is a dominant component or phase, nanofillers can significantly modify the properties of a given matrix.

An exceptionally high surface to volume ratio is a main factor controlling the structure/property relationship of nanocomposites, where particle size is directly related to particle number in a given volume for a given nanofiller content. Regardless of the method employed to produce the nanocomposite, if the nanofiller is not compatible with the matrix then the surface of the nanofiller is often modified to improve its interaction with the matrix.

Carbon nanotubes (CNTs) are particularly useful as nanofillers due to their unique structure, novel properties, and wide applications. Studies have demonstrated water conduction through the hydrophobic channel of a carbon nanotube, including osmotic water transport. Molecular dynamics simulations have also revealed that water ordering near the smooth hydrophobic walls of CNTs helps to facilitate enhanced, frictionless water transport.

CNT functionalization is often important for creating functional groups on the CNT surfaces to allow interaction with solvents, polymers matrices, and/or other nanofillers. The chemical inertness of carbon nanotubes often necessitates specific functionalization of the CNT with different functionalities. Such functionalization provides an opportunity to create an artificial "selectivity filter" that could impart gating properties to a CNT. Oxidation is the most common method for functionalizing CNTs. Using this process, carbons on defected sites of the crystalline structure of CNTs, or on the sites of misaligned $\pi$ bonds, or usually on both, are oxidized to install COOH hydrophilic groups.

CNT-containing membranes can be useful for passing a fluid (such as a liquid or a gas) to achieve, for example, water purification or analyte separation. Liquid sources amenable to purification with CNT-containing membranes may include, for example, fresh water sources or sea water sources containing salts. Other liquids such as blood or plasma, as well as various gases, may be used.

Both charge and size effects can impact exclusion. For example, when nanotubes are charged with positive or negative charges, charged particles in the liquid can be repulsed from or attracted to the nanotubes. These charges can minimize or prevent ions, which might otherwise enter the nanotube, from being transported.

Desalination technologies are concerned with finding alternative sources for drinkable and irrigation water, as well as water used for industrial purposes—other than the ground and the underground fresh water. Sources usually include seawater, brackish water, and wastewater. To date, among the many desalination processes, only a few were applied to industrial-scale fresh water production. This is because commercialization is limited by the amount of energy required, the price per cubic meter of freshwater produced by different processes, and the environmental impact of the process (especially relating to brine discharge). Desalination technologies employed to date include reverse osmosis (RO), multi-stage flash (MSF), and multiple-effect distillation (MED)—as well as electrodialysis (ED), vapor compression distillation (VCD), and micro, ultra, and nanofiltration (MF, UF, NF respectively).

RO is a membrane desalination process, which depends on reversing the osmotic flow through a semi-permeable membrane by applying pressure. The required pressure (and associated energy required) depends on the degree of water salinity as well as the water-permeation characteristics of the semi-permeable membrane. The required pressure and thus the amount of energy consumed can be reduced by developing membranes containing nanopores which are large enough to allow the passage of large volumes of water, but small enough to block the passage of monovalent ions.

Advantages of RO technology over, for example, MSF and MED include significantly lowered energy requirements since no heating is required. A major disadvantage of RO is membrane fouling. Membrane fouling occurs due to the precipitation of a foulant on, in, and/or near the membrane surface, which blocks the nanopores, reduces the desired water flux, and may increase salt permeation. Membrane fouling increases operational pressure and consequently the energy required in the RO process.

To address membrane fouling, fouling pretreatment methods are usually employed that are suited to the initial constituents of the feedwater, i.e., they are directly related to the water source. Microfiltration, Ultrafiltration, and Nanofiltration (MF, UF, NF) also employ semi-permeable membranes, and are often used as pretreatment steps in desalination plants.

3. Description of the Related Art

The current methods of preparing of carbon nanotube membranes (Hinds et al Science, 2004; Holt et al. Science, 2006; Formasiero et. al., PNAS, 2008) involve multiple steps and are limited to making membrane samples of extremely small area. They are also not scalable to large surface areas necessary for the fabrication of commercial membranes for practical applications Membranes containing carbon nanotubes have been disclosed for use in purifying water. For example, WO 2006/060721, describes thin-film composite (TFC) membranes containing multi-walled carbon nanotubes (MWCNTs) in an active layer prepared by interfacial polymerization. However, further improvements in both the performance and the preparation of membranes for reverse osmosis applications are desirable.

Carbon nanotubes (CNTs) as additives have started to draw researchers' interest during the past ten years—especially in light of molecular dynamics simulations suggesting that water should readily pass through CNTs. In published studies, for example, CNTs were added to polymer matrices including polysulfones (PSF), aromatic polyamides, and chitosans to form nanocomposites tested in filtration applications. Certain effects on membrane performance (in terms of permeation and rejection rates) were observed depending upon the compositions employed.

See, e.g., Choi J-H et al., *Journal of Membrane Science* 2006, 284 (1-2), 406-415 (preparing MWCNT/PSF membranes by a phase-inversion method and applied to ulta and nano filtration membranes); Qiu et al., *Journal of Membrane Science* 2009, 342 (1-2), 165-172 (preparing modified-CNT/PSF membranes by a phase-inversion method); Tang et al., *Journal of Membrane Science* 2009, 337(1-2), 240-247 (preparing modified-CNT/chitosan nanocomposites by a solvent evaporation method); Shawky et al., *Desalination* 2011, 272(1-3), 46-50 (preparing CNT/aromatic polyamide (PA) nanocomposites by a solvent evaporation method); Ratto et al., US 2011/0186506 & US 2010/0025330 (preparing multi-layer membranes containing a porous polymer terminated on one side with a skin having CNTs embedded and protruding through the skin); Bakajin et al., WO 2009/148959 &WO 2007/025104 (preparing membranes containing aligned modified-CNTs surrounded by a matrix material); and Wang et al., WO 2012/047359 (preparing thin-film CNT/PA membranes by an interfacial polymerization method). These references are incorporated herein by reference.

Despite the reports described above, suitable porous membranes capable of high water permeation rates and high salt retention, while still exhibiting a high resistance to fouling and long durability, and capable of being produced using a simple and economical method applicable to an industrial scale, have not been reported. Moreover, the use of CNTs as nanofillers in industrially-suitable polymers such as cellulose acetates (CAs) has not been reported.

The object of the present invention was to prepare membranes capable of selectively transporting fluids (such as water and gases) in the presence of both organic and inorganic impurities, using similar or lower pressure and energy requirements than membranes currently used in industrial reverse osmosis and filtration processes. This objective includes providing a simplified procedure for producing industrially relevant CNT-containing membranes with little or no impact on performance relative to existing procedures and membranes.

BRIEF SUMMARY OF THE INVENTION

The inventors of the present invention diligently studied the effects of adding functionalized CNTs as nanofillers to industrially-relevant membranes including cellulose acetate (CA) membranes. These studies also examined the effects of altering nanocomposite preparation conditions on the resulting membrane morphology and performance in terms of permeability and selectivity in water desalination applications.

Preferred embodiments of the invention, described herein such that one of skill in this art can make and use them, include:

(1) The invention involves, in one embodiment, an asymmetric composite membrane containing a polymeric matrix and carbon nanotubes within a single membrane layer, wherein the carbon nanotubes are randomly oriented within the polymeric matrix, and the composite membrane is formed by a phase inversion technique.

(2) In certain embodiments, the polymeric matrix is a cellulose acetate. In certain embodiments a molecular weight of the cellulose acetate ranges from about 25,000 to 250,000 Daltons, and an acetyl content of the cellulose acetate ranges from about 25 to 60 wt % based on a total mass of the cellulose acetate.

(3) In another embodiment, the composite membrane contains less than or equal to about 5 wt % of multi-walled carbon nanotubes.

(4) In some embodiments, the carbon nanotubes of the composite membrane are selected from the group consisting of single-walled carbon nanotubes, double-walled carbon nanotubes, and multi-walled carbon nanotubes.

(5) In another embodiment, the composite membrane additionally contains a pore-forming additive.

(6) In certain embodiments, the carbon nanotubes of the composite membrane range from about 1 nm to 2000 nm in length, and range from about 0.4 nm to about 200 nm in inner and outer diameters. In other embodiments, the carbon nanotubes have an inner diameter ranging from about 0.4 nm to 200 nm, and an outer diameter ranging from about 0.6 nm to about 200 nm.

(7) In some embodiments, the composite membrane comprises a substrate, which may be a microporous support having a surface pore size in the range of about 50 to 5000 Angstroms.

(8) In some embodiments, the carbon nanotubes of the composite membrane are functionalized. In certain embodiments, the carbon nanotube are functionalized by at least one acidic group.

(9) In some embodiments, the composite membrane has an average BET surface area of from about 4 $m^2/g$ to about 9 $m^2/g$.

(10) The invention involves, in one embodiment, a method for producing the composite membrane of claim 1, the method comprising: coating a surface with a film of a polymer solution comprising a polymeric matrix and carbon nanotubes dissolved in at least one solvent; immersing the coated surface in a non-solvent to affect solventl/non-solvent demixing resulting in phase inversion to form a carbon nanotube-containing membrane; and optionally, removing the carbon nanotube-containing membrane from the surface.

(11) In some embodiments of the method (10), the polymeric matrix is a cellulose acetate. In some embodiments of the method (10) an amount of the carbon nanotubes in the polymer solution is such that a proportion of the carbon nanotubes in the composite membrane is less than or equal to 5 wt %, and the carbon nanotube are multi-walled carbon nanotubes.

(12) In some embodiments of the method (10), the carbon nanotubes are functionalized. In some embodiments, the carbon nanotubes are functionalized by at least one acidic group.

(13) The inventions involves a desalination method, comprising passing an ion-containing liquid through the composite membrane (1).

Additional objects, advantages and other features of the present invention will be set forth in part in the description that follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. In this regard, the description herein is to be understood as illustrative in nature, and not as restrictive.

BRIEF DESCRIPTION OF THE SEVERAL DRAWINGS

FIG. 1 is a graph showing the effect of MWCNTs onto the CA membrane permeation rates.

FIG. 2 is a graph showing the effect of MWCNTs onto the CA membrane salt retention rates.

FIG. 3 is a representation of the effect of functionalized MWCNTs addition on the membrane overall performance.

FIG. 4 is a graph representing the effect of different wt % of MWCNTs on CA membranes surface area.

FIGS. 5a-5b are graphs of differential surface area versus pore widths.

FIGS. 6a-6b are graphs of differential pore volume versus pore widths.

FIGS. 7a-7d depict SEM images showing the change in morphology due to MWCNTs addition.

FIG. 8 depicts MWCNT networks in CA/0.01% CNT nanocomposite at different SEM magnifications.

FIG. 9 depicts MWCNT networks in CA/0.005% CNT nanocomposite at different SEM magnifications.

FIG. 10 depicts MWCNT networks in CA/0.0005% CNT nanocomposite at different SEM magnifications.

DETAILED DESCRIPTION OF THE INVENTION

Now, embodiments of the present invention will be described below in detail with references to the accompanying drawings. Before the present compositions and methods are described, it is to be understood that the invention is not limited to the particular methodologies, protocols, and reagents described, as these may vary. It is also to be understood that the terminology used herein is intended to describe particular embodiments of the present invention, and is in no way intended to limit the scope of the present invention as set forth in the appended claims.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. All technical and patent publications cited herein are incorporated herein by reference in their entirety. Nothing herein is to be construed as an admission that the invention is not entitled to antedate such disclosure by virtue of prior invention.

In accordance with the present invention and as used herein, the following terms are defined with the following meanings, unless explicitly stated otherwise.

Definitions

As used in the specification and claims, the singular form "a", "an" and "the" include plural references unless the context clearly dictates otherwise.

All numerical designations, e.g., pH, temperature, time, concentration, and molecular weight, including ranges, are approximations which are varied (+) or (−) by increments of 0.1 or 1.0, where appropriate. It is to be understood, although not always explicitly stated that all numerical designations are preceded by the term "about". It also is to be understood, although not always explicitly stated, that the reagents described herein are merely exemplary and that equivalents of such are known in the art.

As used herein, the term "comprising" or "comprises" is intended to mean that the devices and methods include the recited elements, but not excluding others. "Consisting essentially of" when used to define devices, methods, or kit of parts, shall mean excluding other elements of any essential significance to the combination for the stated purpose. Thus, a composition consisting essentially of the elements as defined herein would not exclude other materials or steps that do not materially affect the basic and novel characteristic(s) of the claimed invention. "Consisting of" shall mean excluding more than trace amount of elements of other ingredients and substantial method steps. Embodiments defined by each of these transition terms are within the scope of this invention.

As used herein the terms composed of, contains, containing, and terms similar thereto, when referring to the ingredients, parts, reactants, etc., of a composition, component, etc., to method steps, etc., mean, in their broadest sense, "includes at least" (i.e., comprises) but also include within their definition all those gradually restricted meanings until and including the point where only the enumerated materials or steps are included (e.g., consisting essentially of and consisting of).

As used herein, the term "membrane" intends a porous material whose lateral dimension is significantly larger than the dimensions across it.

As used herein the term "nanotube" intends a substantially cylindrical tubular structure of which the most inner diameter size is an average of less than about 100 nm. Nanotubes are typically, but not exclusively, carbon molecules and have novel properties that make them potentially useful in a wide variety of applications in nanotechnology, electronics, optics, and other fields of materials science. They exhibit extraordinary strength and unique electrical properties, and are efficient conductors of heat.

"Carbon nanotubes" (CNTs) are polymers of pure carbon, and exist as single-wall and multi-wall structures. Examples of publications describing carbon nanotubes and their methods of fabrication are Dresselhaus, M. S., et al., *Science of Fullerenes and Carbon Nanotubes*, Academic Press, San Diego (1996), Ajayan, P. M., et al., "Nanometer-Size Tubes of Carbon," *Rep. Prog. Phys.* 60 (1997): 1025-1062, and Peigney, A., et al., "Carbon nanotubes in novel ceramic matrix nanocomposites," *Ceram. Inter.* 26 (2000) 677-683. A single-wall carbon nanotube is a single graphene sheet rolled into a seamless cylinder with either open or closed ends. When closed, the ends are capped either by half fullerenes or by more complex structures such as pentagonal lattices.

"Additives" refer to additional materials (a second solvent, a non-solvent, a nanofiller, or a surface modifier) added during membrane preparation with the aim of enhancing permeation rates and/or salt retention. However, permeation rates and retention are inversely proportional to one another since increasing pore sizes across the membrane to enhance the flux, usually leads to allowing more salts to pass through. Thus, experiments target the highest possible salt rejection at acceptable rates. Achieving that is controlled, at least in part, by the concentration and type of the additive, which directly affects the macrovoids sizes and location across the membrane. It also affects the porosity of the top dense layer, for example, changing the membrane type from ultra to nano or to RO filter membrane.

The term "substrate" refers to the body to which the cast polymer in the liquid state together with at least one type of CNT is coated. In some embodiments the "substrate" is porous and may be referred to as the "porous base support."

Carbon Nanotubes

The nanotubes can be single-walled nanotubes (SWNTs), double-walled nanotubes (DWNTs) and multi-walled nanotubes (MWNTs). Nanotubes may be composed primarily or entirely of $sp^2$ bonds, similar to those of graphite. This bonding structure provides the molecules with their unique strength. Nanotubes can align themselves into, by analogy, rope-type or bundle-type structures depending on the type of nanotubes, where such structures are held together by Van der Waals forces. Under high pressure, nanotubes can merge together, trading some $sp^2$ bonds for $sp^a$ bonds, possibly producing strong, unlimited-length wires through high-pressure nanotube linking.

Nanotubes are comprised of various materials, which include but are not limited to carbon, silicon, silica and selenium. Inorganic nanotubes such as boron nitride may also be synthesized. Carbon nanotubes include single wall, double wall, and multiwall types. A "single-wall" is one tubular layer, straight or tortuous, of carbon atoms with or without a cap at the ends. A "double-wall" is two concentric tubular layers, straight or tortuous, of carbon atoms with or without a cap at the ends. A "multi-wall" intends more than two concentric tubular layers, straight or tortuous, of carbon atoms with or without a cap at the ends.

The nanotubes can be arranged in an array wherein a plurality of nanotubes are organized in spatial arrangement with each other. For example, they can be aligned substantially parallel to each other as "substantially vertically aligned" and be generally or substantially perpendicular to a substrate. Nanotubes can be grown off of surfaces that have catalyst particles disposed on the surface in an ordered or disordered array.

In embodiments of the present invention, nanotubes are randomly oriented and dispersed within at least one polymer matrix and are neither substantially vertically aligned or substantially horizontally aligned.

Carbon nanotubes can be prepared by arc discharge between carbon electrodes in an inert gas atmosphere. This process results in a mixture of single-wall and multi-wall nanotubes, although the formation of single-wall nanotubes can be favored by the use of transition metal catalysts such as iron or cobalt. Single-wall nanotubes can also be prepared by laser ablation, as disclosed by Thess, A., et al., "Crystalline Ropes of Metallic Carbon Nanotubes," *Science* 273 (1996): 483-487, and by Witanachi, S., et al., "Role of Temporal Delay in Dual-Laser Ablated Plumes," *J. Vac. Sci. Technol. A* 3 (1995): 1171-1174. A further method of producing single-wall nanotubes is the high-pressure carbon monoxide conversion (HiPCO) process disclosed by Nikolaev, P., et al., "Gas-phase catalytic growth of single-walled carbon nanotubes from carbon monoxide," *Chem. Phys. Lett.* 313, 91-97 (1999), and by Bronikowski, M. J., et al., "Gas-phase production of carbon single-walled nanotubes from carbon monoxide via the HiPC® process: A parametric study," *J. Vac. Sci. Technol.* 19, 1800-1805 (2001). These references are incorporated herein by reference.

Certain procedures for synthesizing nanotubes will produce nanotubes with open ends while others will produce closed-end nanotubes. If the nanotubes are synthesized in closed-end form, the closed ends can be opened by a variety of methods known in the art. An example of a nanotube synthesis procedure that produces open-ended nanotubes is that described by Hua, D. H., WO 2008/048227 A2. This reference is incorporated herein by reference. Closed ends can be opened by mechanical means such as cutting, by chemical means or by thermal means. An example of a cutting method is milling.

Chemical means include the use of carbon nanotube degrading agents, an example of which is a mixture of a nitric acid and sulfuric acid in aqueous solution at concentrations of up to 70% and 96%, respectively. Another chemical means is reactive ion etching. Thermal means include exposure to elevated temperature in an oxidizing atmosphere. The oxidizing atmosphere can be achieved by an oxygen concentration ranging from 20% to 100% by volume, and the temperature can range from 2000 C to 4500 C.

It is common to characterize the structure of the nanotube by its rolled-up vector (n, m), called chirality or helicity, which defines the position of the matched carbon rings during the roll-up of the graphene sheet. Significantly, this roll-up vector fully defines the nanotube morphology, its diameter, and its electronic properties. For example, an (n, m) CNT has an inner diameter, din, of:

$$d_{in} = \left(\frac{a}{\pi}\right)\sqrt{(n^2 + m^2 + nm)} - 2r_c$$

where a is the lattice parameter of graphene (2.5 Å) and $r_c$ is the van der Waals radius of the carbon atom (1.7 Å).

The CNT membranes of the present invention can operate on the basis of both size and charge screening (Donnan exclusion and Coulombic repulsion) effects. The nanometer size of CNTs (for example, 0.5-6 nm), which approaches that of many solvated ions of interest to desalination process, suggests that many species would be unable to enter the nanotube and make it across the membrane. Indeed, recent molecular dynamics simulations of osmotic water transport through carbon nanotube membranes (Karla et al. (2004) *PNAS* 100(18): 10175) suggest that 0.8 nm diameter carbon nanotubes are sufficient to block species as small as hydrated $Na^+$ and $Cl^-$. Yet another screening effect is caused by charge layer overlap at the "mouth" of the nanotube pore where charges are present (Miller et al. (2001) *JACS* B(49): 12335).

Functionalized CNTs include those formed by covalent functionalization making their resulting composites more stable and more controllable. Oxidative purification is the most common method for functionalizing CNTs. In this process, carbons on the defected sites of the crystalline structure of CNTs, or on the sites of misaligned π bonds, or usually on both, get oxidized giving COOH hydrophilic groups. The process involves using concentrated nitric acid, sulfuric acid, or a mixture of both, under reflux conditions. The functionalized CNTs are then washed several times until they are neutralized at pH 7. They are then washed with drying agents such as acetone and THF to remove as much water as possible. Finally, they are dried under vacuum to be ready to use.

So-called "grafting to" and "grafting from" approaches are optionally employed to prepare CNT-polymer adducts or hybrids. The "grafting to" route involves attaching as-prepared or commercially available macromolecules onto the CNT walls and ends by amidation, sterification, radical coupling, or other reactions, followed by removal of unreacted polymers by filtering or centrifuging. A prerequisite of this approach is that the macromolecules must possess suitable reactive functional groups or radicals.

Many linear polymers such as polystyrene (PS), poly (sodium 4-stryrenesulfonate), poly(methyl methacrylate)

(PMMA), polyimide, poly-(2-vinylpyridine), poly(propionylethylen-imine-co-ethylenimine (PPEI-EI), oligomeric and polymeric species containing poly(ethylene glycol) (PEG) blocks, poly-(vinyl alcohol) (PVA) and its related copolymer poly-(vinyl acetate-co-vinyl alcohol) (PVA-VA), and poly(maminobenzenesulfonic acid) (PABS) as well as dendrons, dendrimers, and hyperbranched polymers may be successfully bonded onto CNTs.

Generally, the grafted polymer content is limited due to the relatively low reactivity of macromolecules.

By contrast, the "grafting from" approach, which involves growing polymers from CNT surfaces by the in situ polymerization of monomers in the presence of reactive CNTs or CNT-supported macroinitiators, makes efficient, controllable grafting feasible.

This strategy may be used to graft various linear polymers such as PS, PMMA, poly(sodium 4-stryrenesulfonate), poly (acrylic acid) (PAA), poly(2-hydroxyethyl methacrylate) (PHEMA), poly(n-butyl methacrylate), poly-(tert-butyl acrylate), poly(N-isopropylacrylamide), poly(4-vinylpyridine), and poly(N-vinylcarbazole) as well as hyperbranched poly(3-ethyl-3-hydroxymethyloxetane) and poly(amidoamine) onto CNT surfaces via radical, cationic, anionic, ring-opening, and condensation polymerizations. After grafting, the resulting polymer-CNT nanohybrids exhibit good solubility and dispersibility in solvents, especially at high polymer loadings. In these cases, the CNTs may be reduced to several microns or a few hundred nanometers in length and can be separated from each other individually.

Using these approaches, individual core-shell nanocables with a cylindrical core of nanotube and a shell of polymer layer may be obtained. Furthermore, highly hydrophilic water-soluble polymers, such as poly(2,3-dihydroxypropyl ethacrylate), may be attached to CNT convex surfaces by the "grafting from" approach.

The carbon nanotubes may be functionalized on at least one end of at least one of the nanotubes. Carbon nanotubes may also have pores made of carbon nanotubes with at least one end or the pore entrance of at least one of the nanotube modified by functional groups. The functional groups can be charged groups or uncharged groups. These carbon nanotube membranes exhibit high permeability since water and gas flow through carbon nanotubes is orders of magnitude faster than through other pores with the same or smaller diameter.

The charged groups at the pore entrance and/or the small diameter of the pores causes these membranes to be able to efficiently exclude ions while maintaining ultra fast water permeation. Negatively charged groups provide rejection for anions and can be introduced at the opening of the carbon nanotubes by plasma treatment. Positively charged groups provide rejection for cations and can be introduced by chemical modification. Rejection depends on electrostatic action between the membrane and ions in solution.

The nanotube pore entrance can contain functional groups that change in conformation or charge upon experiencing a change in pH or in temperature. The pH or temperature change can then trigger changes in membrane selectivity. An example of a pH sensitive rejection occurs with carboxylic group functionalization wherein the charge of the carboxylic group is affected with changes in pH. Another example of a temperature-sensitive membrane-selectivity change is the use of a hydrogen-bonded hairpin that can be broken up and reformed (for example a RNA hairpin) under various conditions.

In some embodiments, the nanotube is functionalized with the same or different group. In some embodiments, the nanotube is functionalized with the same group. In some embodiments, at least one end or the pore entrance of at least one of the nanotube is functionalized with a charged group. Examples of charged groups attached to the end or the pore entrance of the nanotube, include, but are not limited to, sulfonate, phosphonate, ammonium, carboxylate, etc. In some embodiments, at least one end or the pore entrance of at least one of the nanotube is functionalized with a non-charged group.

An example of a non-charged group includes, but is not limited to, a non-charged dendrimer. In some embodiments, the nanotube is functionalized with an acidic group or a basic group. In some embodiments, the nanotube is functionalized with a permanently-charged group. In some embodiments, the nanotube is functionalized with a group selected from carboxylic acid, sulfonic acid, phosphonic acid, amine, amide, polymer, dendrimer, and a polyelectrolyte. In some embodiments, the nanotube is functionalized with an amide or polyamide. In some embodiments, the nanotube is functionalized with a short oligomer or a long oligomer of, for example, polyethylene glycol (PEG) polymer. In some embodiments, the nanotube is functionalized with polyelectrolytes. In some embodiments, the nanotube is functionalized with a dendrimer. An example of a dendrimer includes, without limitation, a poly(amidoamine) (PAMAM).

The functionalization of the nanotubes enhances rejection of the ions in the fluid, enhances selectivity of the membranes, and/or reduces fouling of the membranes.

For carbon nanotube pores with sub-6 nm diameter, steric hindrance and/or electrostatic interactions between the charged functionalities on the membrane and ionic species in solution enable effective rejection of ions during salt solution filtration. In some embodiments, the nanotube is functionalized with polymers, branched polymers, dendrimers, or poly(m-aminobenzene sulfonic acid). In some embodiments, the nanotube end or pore entrance is modified by attaching a short chain or long chain primary amine through an amide bond.

CNT Characteristics

The concentration of nanotubes can vary provided that a sufficient number of nanotubes are present per unit volume of the liquid phase in which they are suspended to produce a membrane with a flux great enough to be commercially viable. The concentrations of nanotubes can be expressed in terms of area density, i.e., the number of nanotubes per unit area of the substantially flat or planar surface of one side of the final membrane. For certain applications, a preferred range of area density is from about $1\times10^{11}$ cm$^{-2}$ (nanotubes per square centimeter of membrane surface area) to about $1\times10^{13}$ cm$^{-2}$, and a more preferred range is from about $2.5\times10^{11}$ cm$^{-2}$ to about $2.5\times10^{12}$ cm$^{-2}$. For certain other applications, a preferred density range is from about $2.5\times10^{8}$ cm$^{-2}$ to about $1\times10^{12}$ cm$^{-2}$, and a more preferred density range is from about $2.5\times10^{9}$ cm$^{-1}$ to about $2.5\times10^{11}$ cm$^{-2}$.

One of the most remarkable properties of carbon nanotube structure, which makes it attractive for transport applications, is its unique combination of extremely high aspect ratio with small dimensions. A nanotube can reach up to several millimeters in length, yet retain a diameter of only a few nanometers. Another important property of CNTs critical for transport applications is the remarkable atomic scale smoothness and chemical inertness of the graphitic walls.

The lengths of the nanotubes can vary widely. The lengths are expressed herein as average lengths, using numerical or arithmetic averages. In preferred embodiments, the average length is from about 100 nm to about 2000 nm, most preferably from about 200 nm to about 1000 nm, whether single-wall, multi-wall, or a combination of single-wall and multi-wall.

The carbon nanotubes can be characterized by an average length. The upper end on length is not particularly limited and CNTs hundreds of microns long, such as 500 microns long, can be made. For example, average length can be about 0.1 microns to about 500 microns, or about 5 microns to about 250 microns, or about 0.1 microns to about 5 microns, or about 0.2 microns to about 20 microns, or about 0.2 microns to about 10 microns, or about 0.2 microns to about 5 microns. Average length can be greater than about 0.5 micron, or alternatively greater than about 1 microns, or alternatively, greater than about 3 microns, or alternatively, greater than about 4 microns, or alternatively, about 5 microns to about 100 microns, or alternatively, about 5 microns to about 150 microns, or alternatively, about 5 microns to about 50 microns, or yet further about 1 micron to about 50 microns.

The outer and inner diameters of the nanotubes can likewise vary. In the most common embodiments, the outer diameters can range from about 0.6 nm to about 200 nm, while narrower ranges are often preferred for particular applications. The inner diameters in the most common embodiments can likewise range from about 0.4 nm to about 200 nm, although the optimal diameters for particular applications may be within narrower ranges. For reverse osmosis, and notably for water desalination, a preferred inner diameter range is about 0.4 nm to about 5 nm, and a most preferred range is from about 0.4 nm to about 1.2 nm. For nanofiltration membranes, a preferred size range is from about 1 nm to about 10 nm. For ultrafiltration membranes, a preferred size range is from about 5 nm to about 200 nm.

The average diameter of a single-wall carbon nanotube typically ranges of 0.6 nm to 100 nm, and in many cases 1.5 nm to 10 nm. The aspect ratio, i.e., length to diameter, typically ranges from about 25 to about 1,000,000, and most often from about 100 to about 1,000. A nanotube of 1 nm diameter may thus have a length of from about 100 to about 1,000 nm.

Examples of nanotube densities and diameters for various applications are as follows. For membranes of the invention that are used for desalination applications, preferred nanotubes are single-wall, double-wall and multi-walled carbon nanotubes having outer diameters ranging from about 0.6 nm to about 1.5 nm, preferably from about 0.8 nm to about 1.2 nm, and most preferably from about 0.8 nm to 0.9 nm. Preferred nanotube densities for desalination range from about $1\times10^{11}$ $cm^{-2}$ to about $1\times10^{13}$ $cm^{-2}$, most preferably from about $2.5\times10^{11}$ $cm^{-2}$ to about $2.5\times10^{12}$ $cm^{-2}$.

The carbon nanotubes in a membrane also can also be characterized by a charge density. For example, charge density can be for example at least about 0.5-4 mM, or alternatively at least 1-3 mM, or alternatively at least 2-3 mM, or alternatively at least 1-2 mM, or alternatively, at least 1.5-3 mM, or alternatively at least 0.5-2 mM, or alternatively at least 1.5-2.5 mM.

The carbon nanotubes in a membrane can be characterized by high aspect ratio gaps between the individual carbon nanotubes, wherein the length is much greater than the width. For example, aspect ratio of these gaps can be at least 1,000 length/width.

Asymmetric Membranes

Anisotropic membranes may contain a number of layers, as well as varying degrees of pore size and surface area, each with different structures and permeabilities. Anisotropic membranes containing various pore sizes, distribution and surface areas are referred to herein as asymmetric membranes. Membranes of the present invention include single-layer asymmetric membranes containing various pore sizes, distribution and surface areas, as well as multi-layer anisotropic membranes including at least one single-layer asymmetric membrane. Membranes containing both a single-layer asymmetric membrane and a multi-layer anisotropic membrane are also referred to herein as an asymmetric membranes.

A typical anisotropic, multi-layer membrane has a relatively dense, extremely thin surface layer (i.e. the "skin", also called the permselective layer) supported on an open, much thicker porous substructure. The separation properties and permeation rates are determined exclusively by the surface layer; and the substructure functions as mechanical support, with virtually no separating function. The resistance to mass transfer is determined largely or completely by the thin surface layer.

The multi-layer membrane can be made thick enough to withstand the compressive forces used in separation. A thin film is almost always on the high-pressure side of the membrane, that is, the feed side, since in this way maximum use of any support layer may stabilize the thin film. These membranes have the advantage of higher fluxes, and are applicable to many commercial processes.

Asymmetric membranes provide fast flow, low pressure drops, and highly consistent flow rates in various filtering applications. Asymmetric membranes are often different from conventionally cast microporous membranes in that larger pores on the upstream side of the membrane may act as a prefilter while the downstream side, or exclusion zone containing smaller pores, may act as an absolute cut off layer. This is in contrast to traditional microporous materials which have comparable pore sizes on both the upstream and downstream sides of the membrane. The graded nature of asymmetric membranes may result in a sidedness to the membrane. Asymmetric membranes of the present invention may also include various pore sizes, distribution and surface areas but without a graded sidedness.

Membrane Polymer Materials

"Polymers" useful in preparing the membranes of the invention include, but are not limited to, aromatic polyamides, aliphatic polyamides, cellulose acetates, cellulose nitrate, cellulosic derivatives, ethyl cellulose, polyesters, polycarbonates, copolycarbonate esters, polyethers, polyetherketones, polyetherimides, polyethersulfones, polyetheresters, polysulfones, polyvinylidene fluoride, polybenzimidazoles, polybenzoxazoles, polyacrylonitrile, polyazoaroaromatics, poly(2,6-dimethylphenylene oxide), polyphenylene oxides, polyureas, polyurethanes, polyhydrazides, polyazomethines, polyacetals, styrene-acrylonitrile copolymers, brominated poly(xylene oxide), sulfonated poly(xylylene oxide), polyquinoxaline, polyamide imides, polyamide esters, polysiloxanes, polyacetylenes such as poly(trimethylsilylpropyne), polyphosphazenes, polyolefines such as polyethylene, polypropylene and poly(4-methylpentene), polyphenylenes, polyimides, polyesters and so called ladder polymers, polyacrlonitrile, polyphthalamides, polysulfonamides, polyamide-imides, phenylene diamines such as ortho-phenylenediamine and meta-phenylenediamine, Matrimid®, Leming P84, polyamide hydrazide, Nylon 6, poly(ethylene-eo-vinyl alcohol), polytetrafluoroethylene, and the like and any blends, copolymers, and substituted polymers thereof. Polymers preferred for preparing the membranes of the invention include industrially-practicable polymers such as cellulose acetates.

Among the materials employed to produce semi-permeable membranes, cellulose acetate (CA) is a relatively cheap, mechanically tough, chlorine resistant, hydrophilic abundant polymer that results from the acetylation of cellulose as in the reaction below:

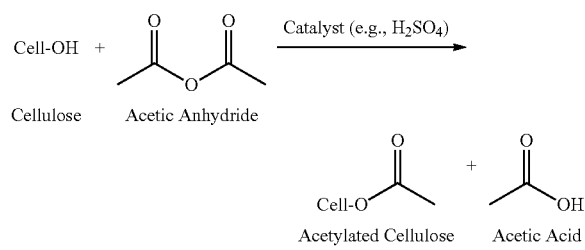

CA membranes were first developed in the 1960's to become the first high flux asymmetric (anisotropic) membranes used in large number of applications including reverse osmosis, micro, ultra and nanofiltration, gases separation, water desalination, and wastewater treatment.

Water permeation and salt rejection rates of CA membranes are affected by the acetylation degree of the cellulose. In general, a cellulose structure has three OH groups that can be partially or fully substituted. A completely acetylated cellulose, which is acetylated by three acetate groups (equivalent to 44.2% wt of acetyl groups) and is known as cellulose triacetate, was found to have high salt rejection rates of 99.5% from seawater feed. However, water flux is the lowest possible. On the other hand, lower acetylation percentage gave higher permeation rates but with lower salt rejection. The commercial cellulose acetate membranes used in RO desalination for example have 40% wt acetate, equivalent to acetyl content of 2.7 on the scale of 0 (the OH groups are not substituted) to 3 (the OH groups are fully substituted). These membranes yield 98-99% salt rejection rates at reasonable water fluxes.

Regarding membrane fouling, CA membranes are relatively protected from biofoulants due to their hydrophilic smooth surface, which doesn't leave inter-membrane gaps or interfacial water-resistant areas for foulants to grow. Being chlorine resistant (up to 1 ppm of continuous exposure to free chlorine) helps in using them in high bacterial count water sources, pretreated with chlorine. CA membrane surfaces are also neutrally charged, thus reducing the charged macromolecules fouling.

The most common preparation method of CA membranes is known as phase inversion or wet phase separation process. In this method, CA is first dissolved in a solvent. Then, on a substrate, usually but not always glass, the solution is homogeneously spread using, for example, a casting knife to maintain a uniform casting thickness. The casted film is then immersed into a coagulation bath filled with a CA non-solvent solution, (usually water) that is highly miscible with the solvent used. At this point, liquid-liquid demixing takes places where the solvent's affinity towards the non-solvent is higher than towards CA. Thus the solvent is extracted into the medium. Meanwhile, water starts defusing to replace the solvent, while repelling CA into the casted solution borders until a point at which the concentration of CA becomes high enough for gelation to take place. The solidified CA is in the form of an asymmetric thin membrane with a polymer rich dense layer and a polymer lean porous sub-layer.

Pores in the sublayer (resulting from nucleation) are the result of solvent/non-solvent exchange within the membrane, where nucleation grows as long as demixing continues. An additional step could be used in modifying the membrane morphology, which is the annealing step. At this step, the membrane is placed for a short period of time (few minutes) in a hot water bath in which the membrane top layer becomes more condensed. The membrane is finally placed in storage medium (usually distilled water) to remove the excess remaining solvent.

Membranes with smaller pore size and porosity have good mechanical property and separation capacity, but their applications in some fields are limited to low mass transport rate.

CA membrane permeability and selectivity in water treatment are primarily controlled by the morphology in terms of its voids structure, size, and distribution. The morphology can be manipulated using several ways including varying the preparation conditions such as CA content, initial casting thickness, coagulation bath temperature, and presence of organic or inorganic additives. Morphology can also be manipulated by mixing CA with other polymers to form a blend or by adding different types of nanofillers to form a nanocomposite.

It is well known that for a given polymer, there is a flux-rejection trade-off curve that defines the upper bound of the flux-rejection relationship. Although one can obtain high membrane flux through certain modification, a trade-off typically occurs in in terms of salt rejection. On the other hand, one can obtain high membrane salt rejection with trade-off in terms of membrane water permeability. It is highly desirable to obtain membrane materials with which can be modulated without the trade-offs described above, i.e., by achieving both high flux and high salt rejection.

Phase-Inversion Method

Membranes of the invention are asymmetric membranes formed by phase inversion using immersion precipitation techniques, whereby a cast polymer in liquid state together with at least one type of nanotube is transformed into a solid state by immersion in a non-solvent. The immersion precipitation produces a porous membrane. A variety of process variables will impact the physical characteristics of the membrane as a whole. Polymer type, polymer concentration, polymer solvent, nanotube identity and processing, precipitation liquid, time and temperature variations differentially affect the process.

Accordingly, membranes of the invention are prepared by (a) coating a substrate with a film of polymer solution comprising a polymer and at least one type of nanotube dissolved in a solvent; (b) directly immersing the coated substrate in a non-solvent to affect solvent/non-solvent demixing resulting in phase inversion, to form a nanotube-containing porous membrane; and (c) optionally separating the porous membrane from the substrate. When CNTs are employed, CNT functionalization generally occurs before the mixing with the polymer solution, but is not limited to such pre-functionalization. CNTs may be functionalized after membrane formation.

Coating of the liquid polymer nanotube-containing solution is generally carried out by spreading a thin layer of the polymer solution onto a substrate. The coating is carried out at −10 to 90° C., preferably at about ambient temperature.

The polymer solvent type will be dictated by the polymer type and the precipitation liquid. Suitable solvents, in general, include polar aprotic solvents, e.g., N,N-dimethylacetamide, N,N-dimethylformamide, dimethyl sulfoxide, N-methyl-2-pyrrolidinone, acetone, and the like. Polymer concentrations will vary with the polymer type. Typically the polymer concentration will be from about 10 to about 30% by weight and preferably about 20% by weight. The polymer is generally spread onto the substrate to a thickness of 0.001 to 1 mm and preferably to about 0.25 mm.

The demixing step is carried out at ambient temperature to −10° C. and requires 5 minutes to several hours to complete. Suitable precipitation liquids are those that are a non-solvent for the polymer. Suitable non-solvents are polar solvents, e.g., water, alcohols, glycols, and the like or suitable mixtures thereof. The precipitation step is carried out in a manner that a heterogeneous pore structure forms a substantially impermeable barrier containing the nanotubes.

When two liquid phases are used, the two phases are at least partially immiscible with each other, and when three liquid phases are used, the second and third phases are at least partially immiscible with the first phase. The second and third phases are not required to be immiscible, partially or otherwise, and as will be seen below, the second and third phases can be, and preferably are, formed with the same solvent. Where two phases are characterized herein as "at least partially immiscible," the quoted expression means that the solvents used in the phases form separate and stable phases at equilibrium, either due to a lack of solubility of one solvent in the other or to a limited solubility of one or both solvents in the other.

For solvents with mutual but limited solubilities, each solvent is saturated with the other prior to the placement of the phases in contact, with or without a polymerizable species having first been dissolved therein. Often, therefore, the only diffusion, if any, between the phases once contacted will be that of the polymerizable species. Preferably, each pair of at least partially immiscible phases consists of a non-polar phase as one of the pair and a polar phase as the other, with non-polar and polar solvents, respectively.

Examples of non-polar solvents are benzene, halobenzenes, alkyl benzenes, non-polar alkanes, non-polar haloalkanes, and non-polar alkyl-substituted alkanes. The various substituted benzenes and alkanes include those with single substituents and those with multiple substituents, and the latter include combinations of substituents, such as halo and alkyl, on the same structure, as well as those with two or more alkyl substitutions or two or more halo substitutions. Among the alkanes, $C_5$-$C_{12}$ alkanes are preferred. Other than benzene, specific examples of non-polar solvents are chloroform, toluene, xylene, mesitylene, ortho-dichlorobenzene, hexane, heptane, and tetrachloroethylene. Mixtures of non-polar solvents can also be used, for example, a mixture of hexane and chloroform, preferably at a hexane:chloroform volume ratio of from about 1:1 to about 10:1, more preferably from about 2:1 to about 5:1, and most preferably 3:1. Examples of polar solvents are water, alcohols, and glycols, used either individually or as mixtures. Preferred alcohols are methyl alcohol, ethyl alcohol, and isopropyl alcohol, and preferred glycols are ethylene glycol and propylene glycol.

In many applications, the CNT-containing membrane is in the form of a flat disk or a sheet which may be rolled. For these applications, disks of a relatively small size are often the most appropriate, and a preferred diameter range for these applications is from about 10 mm to about 100 mm. Diameters ranging from 13 mm to 47 mm, specifically disks of 13 mm, 25 mm, and 47 mm, are of particular interest. For disks of diameters between 10 mm and 100 mm, the disk thickness preferably ranges from about 0.15 mm to about 0.25 mm.

The composite membrane can also be prepared in the form of rectangular sheets having widths ranging from 1 inch (2.5 cm) to 40 inches (102 cm). Widths of 9.75 inches (24.8 cm), 10 inches (25.4 cm), 20 inches (51 cm), and 40 inches (102 cm) are of particular interest. The lengths of the sheets will most often range from about four inches (ten cm) to about 400 feet (122 m). For a sheet of these lateral dimensions, the sheet thickness preferably ranges from about 0.15 mm to about 0.25 mm. In general, the thickness of the support is of less importance than the thickness of the membrane, since the support need only be thick enough to provide structural support for the membrane.

In order to improve permeability and/or salt rejection, the CNT-containing membrane may be post-treated with an oxidizing solution, such as a sodium hypochlorite solution. The concentration of sodium hypochlorite in the solution may range from about 50 ppm to about 4000 ppm, and, in some embodiments, from about 50 ppm to about 500 ppm.

Substrate

Membranes in accordance with the present invention may be formed over microporous supports or substrates that establish the lateral dimensions and shape of the membranes as they are being formed and that provide the finished membranes with structural stability. A support in accordance with this invention serves these purposes by receiving the liquid phases during the membrane fabrication and retaining the membrane formed by phase inversion. The support can be made of any material that is wettable by the liquid phase that is first placed in contact with the support, and stable under the reaction conditions, and one to which the polymer thus formed will adhere.

Examples of materials from which the support can be made are glass, metals and polymers such as polyethersulfones, polysulfones, nylons (and polyamides in general), and polyesters. While the support itself can serve a filtering function by size exclusion, its filtering characteristics if any will be substantially more coarse, due to its microporous nature, than those of the membrane itself and specifically the nanotubes in the membrane. Within this limitation, the porosity of the support can vary widely. In most cases involving a polymeric support, it will be convenient to use a support with a molecular weight cutoff (MWCO) of from about 1 kDa to about 10 MDa, and preferably from about 5 kDa to about 300 kDa. An example of a polymeric microporous support presently contemplated is a polysulfone with MWCO of 10 kDa to 1 MDa, and preferably a polysulfone with MWCO of 300 kDa. In terms of pore size, the microporous support can have pores ranging from 3 nm to 200 nm in diameter.

The dimensions of the microporous support will generally be selected to meet the needs of the particular application. These needs include the lateral area through which fluids will pass when the membrane is used in purification, filtration, or other treatment of the fluids, as well as the pressure differential that will be imposed across the combined support and membrane during use. Preferred supports are those that are capable of withstanding pressure differentials of from about 1 atmosphere to about 85 atmospheres without rupturing.

In one example, for illustration and not limitation, a porous base support includes a support material having a surface pore size in the approximate range from about 50

Angstroms to about 5000 Angstroms. The pore sizes should be sufficiently large so that a permeate solvent can pass through the support without reducing the flux of the composite. However, the pores should not be so large that the permselective polymer membrane will either be unable to bridge or form across the pores, or tend to fill up or penetrate too far into the pores, thus producing an effectively thicker membrane than 200 nanometers. U.S. Pat. No. 4,814,082 (W. J. Wrasidlo) and U.S. Pat. No. 4,783,346 (S. A. Sundet), which are incorporated herein by reference, are illiustrative of methods of choosing and preparing a porous base support for thin film composite membrane formation.

Non-limiting examples of the polymeric materials forming the porous base support include polysulfone, polyether sulfone, polyacrylonitrile, ceilulose ester, polypropylene, polyvinyl chloride, polyvinylidene fluoride and poly(arylether) ketones. Other porous materials might be used as well, such as ceramics, glass and metals, in a porous configuration. A wide variety of suitable porous base membranes are either available commercially or may be prepared using techniques known to those of ordinary skill in the art.

In some embodiments, a porous base membrane which is a polysulfone membrane or a porous polyethersulfone membrane are used because of their desirable mechanical and chemical properties. Those of ordinary skill in the art will be able to make the selection from among the suitable materials.

The thickness of the material forming the porous base support may be between about 75 and about 250 microns thick, although other thicknesses may be used. For example, a 25 microns thick porous base support permits production of higher flux films. In some cases, the porous base support may be relatively thick, for example, 2.5 cm or more, where aqueous solution is applied to only one side, which is subsequently contacted with the organic solution, forming the interface at which polymerization occurs.

The polymeric porous base support may be reinforced by backing with a fabric or a nonwoven web material. Non-limiting examples include films, sheets, and nets such as a nonwoven polyester cloth. The polymer of the porous base support may permeate through the pores, be attached on both sides of the support, or be attached substantially on one side of the support.

Separation of the heterogeneous pore structure from the substrate if desired can be carried out by any means that separates the membrane from the substrate while maintaining an intact membrane. Typically the membrane is gently peeled away from the substrate.

Applications

The membranes of the present invention can be used in a wide variety of applications including for example water desalination, water demineralization, gas separation (including removal of hydrocarbons, carbon dioxide sequestration, etc.), dialysis, and for use in breathable materials for protecting against chemical and biological agents.

A further embodiment is a method for separating analytes from a fluid and therefore purifying a fluid by passing the liquid or gas to be purified through at least one carbon nanotube as described herein. In one aspect, the nanotubes are contained within a membrane and the fluid to be purified is water for example from fresh water sources or sea water containing salt. In some embodiments, the liquid is blood or plasma. The method may also comprise collecting the liquid or gas after passing through a membrane containing one or more nanotubes.

Both charge and size effects can impact exclusion. Nanotubes may be charged at the end with positive or negative charges so that charged particles can be repulsed or attracted to the nanotubes. Charge prevents ions from entering the nanotube which might otherwise enter the nanotube if not for the charge.

As will be apparent to those of skill in the art, the membranes as described herein can also be for filtration and separation of large airborne particles from gases using the techniques described. Different gases in gas mixtures can also be separated from each other using these membranes. For example, one of the important gas pairs for separation is $CO_2/N_2$. It is known that unfunctionalized membranes do not exhibit high selectivity of $CO_2/N_2$ but that functionalization with groups, such as but not limited to, amine increases the gas selectivity of the membranes. Functionalization often also decreases the permeability of the membrane.

For membranes that are used for gas separations, preferred nanotubes include single-wall carbon nanotubes having outer diameters ranging from about 0.6 nm to about 1.0 nm, more preferably from about 0.6 nm to about 0.8 nm, and optimally about 0.7 nm. For these applications, nanotube area densities may preferably range from about $1 \times 10^{11}$ cm$^{-2}$ to about $1 \times 10^{13}$ cm$^{-2}$ and most preferably from about $2.5 \times 10^{11}$ cm$^{-2}$ to about $2.5 \times 10^{12}$ cm$^{-2}$.

For membranes that are used for nanofiltration applications, preferred nanotubes are combinations of single-wall and multi-wall carbon nanotubes having inner diameters ranging from about 1.5 nm to about 10.0 nm, and nanotube area densities will preferably range from about $1 \times 10^{11}$ cm$^{-2}$ to about $1 \times 10^{13}$ cm$^{-2}$. For membranes that are used for ultrafiltration applications and particularly for viral or bacterial filtrations, preferred nanotubes are combinations of single-wall and multi-wall carbon nanotubes having outer diameters ranging from about 10 nm to about 200 nm, and nanotube area densities will preferably range from about $1 \times 10^{6}$ cm$^{-2}$ to about $1 \times 10^{11}$ cm$^{-2}$.

EXAMPLES

The following examples are provided for illustration purposes only and the in no way limit the scope of the present invention. Other types of polymers, carbon nanotubes (both single-walled, double-walled, multiple-walled, functionalized and unfunctionalized), substrates, and various other additives, fillers, and process conditions are also applicable to present invention.

Materials

Cellulose acetate (CA) (avg. molecular weight 50,000, 39.7 wt % acetyl content) was purchased from Sigma-Aldrich Co. Acetone (density 0.791 g/mL in 25° C., purity ≥99.8%) purchased from Sigma-Aldrich Co. was used as a solvent. Deionized water was used as a non-solvent. MWCNTs Baytubes® C150P (C-purity ≥95 wt %, inner diameter of ~4 nm, outer diameter of ~13 nm, and length >1 μm) purchased from Bayer Material Science AG. were used as nanofillers. $H_2SO_4$ (purity=99.999%) purchased from Sigma-Aldrich Co. and $HNO_3$ (purity=69%) purchased from Patel Group, India were used in oxidative purification of the MWCNTs.

Preparation of Functionalized Multi-Walled Carbon Nanotubes 12 g of pristine MWCNTs were added to 300 mL $H_2SO_4$ and 100 mL $HNO_3$ (3:1 by volume) in a round bottom flask.

The flask was immersed in ultrasonic bath for 10 minutes to disperse the CNTs. The flask was then connected to a reflux apparatus with continuous water circulation to minimize acid evaporation. The top of the reflux apparatus was connected to a bottle filled with concentrated solution of NaOH. The flask was immersed in a boiling water bath for 100 minutes, after which the flask was cooled down under tap water. Filtering CNTs was done using Whatman 0.2 µM pore size Teflon filter membranes placed in a microfilteration system connected to a pump.

The precipitate was washed with deionized water until the pH of the filtrate was neutral. The precipitate was then washed with 50 mL of acetone to ensure the complete removal of water. Then it was placed in a desiccator for 24 hours to complete drying. The functionalized MWCNTs were then ground in a ceramic mortar, and the particles passed through a 180 µm pores sieve to obtain fine-powdered, functionalized MWCNTs (F-CNTs).

The F-CNTs were characterized using FTIR spectroscopy using KBr pellet method, as well as SEM and TEM imaging. (details of the characterization)

Examples 1-4

Preparation of Cellulose Acetate Mixtures 15 wt % (15 g) the CAs described above were dissolved in different wt % of acetone determined according to the wt % of the F-CNTs to be added. The mixture was left overnight under continuous stirring until the CAs completely dissolved forming clear homogenous solutions. F-CNTs were dispersed in deionized water by sonication for 10 seconds, then each aqueous solution was added in stages to a respective CA stock solution with vigorous stirring. After all the F-CNTs were added to the CA solutions, the mixtures were sonicated for 2 minutes, then left overnight to allow any trapped air bubbles to dissipate. Different masses of F-CNTs were added to form stock solutions, in order to result in $5 \times 10^{-4}$ wt %, $5 \times 10^{-3}$ wt %, and $1 \times 10^{-2}$ wt % F-CNT in the resulting CA solid membranes. A blank membrane having no CNTs was also prepared using the same procedure above. The amounts of the F-CNTss for each of Examples 1-4 are depicted in Table 1.

TABLE 1

| Example | Amount of MWCNT (wt %) |
| --- | --- |
| 1 | none |
| 2 | $5 \times 10^{-4}$ |
| 3 | $5 \times 10^{-3}$ |
| 4 | $1 \times 10^{-2}$ |

Preparation of Membranes

For each of Examples 1-4, on a glass substrate the respective stock solution was cast with a casting knife and directly immersed in a deionized water bath at room temperature to affect a solvent/non-solvent demixing resulting in phase inversion. The final membrane thickness was adjusted to 100±10 µm. The resultant nanocomposite membrane was then stored in deionized water; and then left for at least 24 hours prior to permeation and salt rejection testing to ensure a complete solvent removal.

Nanocomposite Testing and Characterization

In a water cell, a 5 cm diameter membrane disc was placed with a porous metal support, and the cell was filled with a 1000 ppm NaCl feed solution. Pressure of 24 bars was applied using $N_2$ gas to test for permeate salt retention and flux rate.

Permeation flux rate was calculated using the following equation:

$$J = \frac{V}{A \cdot t}$$

where J is water flux (L/m²h), V is permeate volume that passed through the membrane (L), A is the total area of the membrane on which pressure is applied (m²), while t is the time take for the permeate to fill a certain volume V (h).

Salt retention was investigated using titration method where 1 mL of permeate was titrated with standardized $AgNO_3$ solution and potassium dichromate indicator. The retention rate (%) was calculated from the following equation:

$$R = 100 \times \left(1 - \frac{C_p}{C_f}\right)$$

where R (%) is retention rate (how much salt is retained by the membrane), $C_p$ is the salt concentration of the permeate, $C_f$ is the salt concentration in the feedwater.

Both permeation and salt retention rates were measured for three times for each membrane composition, and the average obtained.

Characterization of the membrane cross-section was carried out using SEM to investigate the membrane final thickness (compaction), and CNTs distribution and orientation in the membrane. Membranes' pores size distribution and pores surface area were investigated using BET pore analyzer.

Results

Permeation and salt retention rates for the 15 wt % CA membranes of Examples 1-4 having 0, 0.0005, 0.005, 0.01 wt % functionalized F-CNTs as nanofillers were measured using 1000 ppm NaCl solution in pressurized water cell at 24 bars and room temperature. FIG. 1 shows the significant increase in permeation rate due to the addition of only 0.0005 wt % F-CNTs (Example 2) vs. the blank 0 wt % F-CNTs (Example 1) in the respective CA membranes. Increasing the nanotube content to 0.005 wt % (Example 3) slight decreases the permeation rate. Further increasing the nanotube content to 0.01 wt % (Example 4) lead to a sharp decrease in the permeation rate—to a rate almost equal to that of the blank CA membrane (Example 1).

Salt retention rates were not significantly affected by the addition of 0.0005 and 0.005 wt % F-CNTs (Examples 2 and 3) when compared to the blank CA membrane (Example 1), as illustrated in FIG. 2. The membranes of Examples 2 and 3 exhibited only a slight decrease in the salt retention as compared to the membrane of Example 1. By contrast, the further addition of F-CNTs to 0.01 wt % (Example 4) reduced the nanocomposite retention rate by more than 50%.

Comparing the overall membrane performance based upon permeation and salt retention rates, FIG. 3 illustrates the enhanced permeation rate with only minor drop in salt retention rate for the 0.0005 and 0.005 wt % F-CNTs/CA membranes (Example 2 and 3) when compared to the blank CA membrane (Example 1) and the 0.01 wt F-CNTs/CA membrane (Example 4).

The pore surface areas for the membranes of Examples 1-4 varied according to the F-CNTs content as illustrated in FIG. 4. The addition of only 0.0005 wt % F-CNTs (Example 2) had an insignificant effect on the surface area when compared to blank CA membrane (Example 1). Further increasing in the nanofiller content to 0.005 wt % and 0.01 wt % (Examples 3 and 4) decreased the surface area, where a sharp decrease was observed on the addition of 0.01 wt % F-CNTs (Example 4).

Table 2 summarizes the effect of the addition of different wt % of functionalized F-CNTs as nanofillers on CA membranes' permeation rate, salt retention rate, and surface area.

between pores). The noticeable permeation decrease after addition of 0.01 wt % of CNTs can be related to the significant decrease in the membrane porosity (as reflected in the decrease in pore surface area, pore volume, and the overall surface area). This implies that water permeation through the composite membrane is dependent on the effect of both the CNTs and the membrane porosity.

Salt retention, on the other hand, appears to be more dependent on membrane porosity—particularly for smaller pores (less than 10 nm). For these smaller pores salt retention exhibits only a small decrease with the addition of CNTs (observed salt retention descreases are about 6% and 7% for 0.0005 wt % and 0.005 wt % CNTs, respectively). For the 0.01 wt % CNT composite membrane, where the number of smaller pores is significantly reduced, salt retention is

TABLE 2

Effect of MWCNTs wt % on permeation, salt retention, and surface area; rate measurements are for 100 ± 10 µm membranes using 1000 ppm NaCl solution at 24 bars and room temperature

| Sample Name | CNTs Additive % | Avg. Permeation rate (L/m$^2$h) | Change in Avg. Permeation rate | Avg. Salt retention % | Change in Avg. Retention rate | Avg. BET Surface area (m$^2$/g) |
|---|---|---|---|---|---|---|
| CA/0%CNTs | 0% | 12.82 ± 2.11 | — | 73.82 ± 1.4% | — | 7.96 ± 0.51 |
| CA/0.0005%CNTs | 0.0005% | 19.57 ± 1.36 | 52.65% | 69.37 ± 2.9% | −6.03% | 8.07 ± 1.19 |
| CA/0.005%CNTs | 0.005% | 18.62 ± 1.62 | 45.24% | 68.8 ± 1.3% | −6.80% | 7.29 ± 0.76 |
| CA/0.01%CNTs | 0.01% | 12.15 ± 1.13 | −5.23% | 34.75 ± 0.3% | −52.93% | 4.06 ± 2.11 |

The graphs presented in FIGS. 5a-5b and 6a-6b appear to demonstrate that water permeation through the composite membranes of the present invention may be dependent on the effect of the CNTs as well as the membrane porosity—whereas salt retention appears to be more dependent on membrane porosity (particularly with small pores of less than 10 nm in width).

FIG. 5a shows a graph of differential pore surface area (m$^2$/g) versus pore width (nm) for pore widths of less than or equal to 20 nm. Within this range of pore widths, three distinct ranges of nanopores having maxima at about 1.7 nm, 2.7 nm and 5 nm exist. The surface area of the nanopores at these maximas is significant (9 m$^2$/g, 2.2 m$^2$/g and 0.7 m$^2$/g, respectively) for the membranes without CNTs or with lower concentrations of CNTs (0.0005 wt %). By contrast, the membrane containing the highest amounts of CNTs (0.01 wt %) exhibits significantly lower surface areas—about 3 m$^2$/g, 0.2 m$^2$/g and 0 m$^2$/g, respectively. Clearly, addition of CNTs causes a reduction in the surface areas of the resulting pores in this range of pore widths. By contrast, in FIG. 5b, which shows a graph of differential pore surface area (m$^2$/g) versus pore width (nm) for pore widths of greater than or equal to 20 nm, no distinct maxima or effect on pore surface area is observed.

FIG. 6a shows a graph of differential pore volume (cm$^3$/g) versus pore width (nm) for pore widths of less than or equal to 20 nm. It is evident that the nanopores corresponding to the highest surface areas of FIG. 5a (at about 1.7 nm, 2.7 nm and 5 nm) possess relatively lower pore volumes (of less than 0.01 cm$^3$/g). By contrast, FIG. 6b, which shows a graph of differential pore volume (cm$^3$/g) versus pore widths of greater than or equal to 20 nm, reveals several maxima of larger pores (at about 23 nm, 37 nm, 54 nm, 68 nm, 93 nm, 117 nm and 148 nm).

Comparing the data in Table 2 and FIGS. 1-4 with the data in FIGS. 5a-5b and 6a-6b suggests that the CNTs may be acting in conjunction with membrane pores to allow greater passage of water (perhaps acting as connecting channels reduced by more than 50% as compared to the membranes without CNTs. This observation, combined with the permeation values comparable to those of the membrane without CNTs, suggests that for 0.01 wt % CNT membranes water permeation is occurring predominantly through larger pores (pore widths of greater than 20 nm). These larger pores are less effective in salt retention, which may explain the significant decrease in salt retention values observed.

The F-CNTs of Examples 2-4 were found to achieve a good dispersion into the matrix of CA membranes. As illustrated in the SEM images of FIGS. 7a-7d, the addition of the F-CNTs to the CA membranes resulted in significantly more compaction and nearly complete disappearance of large voids.

Compaction is related to the reduction in thickness that occurs during the phase-inversion process. The reduction in thickness may be quantified by measuring a change (reduction) in thickness between an initial layer containing a mixture of polymer in a liquid mixture phase (as initially applied prior to solidification) and the final membrane following solidification. Compaction is the ratio of a reduction in thickness for a mixture containing CNTs to a reduction in thickness for a mixture without CNTs. In the present invention, significantly more compaction occurs when the F-CNTs are added to the initial mixture with polymer.

The orientation of functionalized F-CNTs within the matrix of CA membranes was also investigated using SEM, as shown in FIGS. 8-10. Large networks of F-CNTs were present for the 0.005 and 0.01 wt % membranes of Examples 3 and 4. Individual nanotubes were observed for Example 4 using 0.0005 wt % F-CNTs. FIGS. 8-10 show that the F-CNTs were randomly oriented and dispersed within the CA membranes, creating large networks that extended across the membranes. The random orientation is evidenced by the lack of any clusters which tend to form when CNTs are not randomly oriented.

The data presented herein illustrates that, in conjunction with the use of low-cost phase-inversion methods for preparing asymmetric porous membranes, addition of relatively small amounts of randomly-oriented and well-dispersed CNTs, especially functionalized MWCNTs, to porous membranes including CA membranes significantly increased permeation rates while maintaining good salt retention rates. At the same time, membrane morphology and pore surface area were insignificantly affected at relatively low CNT content.

The inventive CNT-containing membranes described and exemplified herein are distinguishable from previously described membranes in that the present membranes are produced using much simpler, cost-effective, and industrially-scalable phase-inversion methods. Furthermore, the inventive membranes, which include asymmetric CA membranes, contain randomly-oriented and optionally functionalized CNTs. These membrane exhibit enhanced performance in terms of increased permeation rates with little or no reduction in salt retention, relative to non-CNT-containing membranes.

The above written description of the invention provides a manner and process of making and using it such that any person skilled in this art is enabled to make and use the same, this enablement being provided in particular for the subject matter of the appended claims, which make up a part of the original description.

All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

What is claim is:

1. A single-layer composite membrane, comprising a polymeric matrix and multi-walled carbon nanotubes (MWCNTs) within a single membrane layer, wherein:
    the MWCNTs are randomly oriented, functionalized by carboxylic acid groups prior to being disposed in the single-layer composite membrane, and located exclusively within the polymeric matrix;
    a proportion of the MWCNTs ranges from greater than or equal to 0.0005 wt % to equal to or less than 0.005 wt % relative to a weight of the polymeric matrix;
    the MWCNTs range from about 1 nm to 2000 nm in length, and from about 0.4 nm to about 200 nm in inner and outer diameter;
    the single-layer composite membrane is formed by phase inversion, provided that formation of the single-layer composite membrane does not include an annealing step;
    the single-layer composite membrane is an asymmetric membrane;
    the single-layer composite membrane is a solid composite membrane;
    the single membrane layer is optionally supported by a substrate having more coarse filtering characteristics than filtering characteristics of the single membrane layer;
    the polymeric matrix is a cellulose acetate; and
    the single-layer composite membrane has an average salt-retention rate of greater than 68.8% when filtering a 1000 ppm NaCl solution in a pressurized water cell at 24 bars at room temperature.

2. The single-layer composite membrane of claim 1, wherein:
    a molecular weight of the cellulose acetate ranges from about 25,000 to 250,000 Daltons; and
    an acetyl content of the cellulose acetate ranges from about 25 to 60 wt % based on a total mass of the cellulose acetate.

3. The single-layer composite membrane of claim 1, further comprising a pore-forming additive.

4. The single-layer composite membrane of claim 1, wherein the MWCNTs range from about 1 nm to 1000 nm in length, and from about 0.4 nm to about 200 nm in inner and outer diameters.

5. The single-layer composite membrane of claim 1, wherein the MWCNTs have an inner diameter ranging from about 0.4 nm to 200 nm, and an outer diameter ranging from about 0.6 nm to about 200 nm.

6. The single-layer composite membrane of claim 1, comprising the substrate having more coarse filtering characteristics than filtering characteristics of the single membrane layer.

7. The single-layer composite membrane of claim 6, wherein the substrate is a microporous support having a surface pore size in a range of about 50 to 5000 Angstroms.

8. The single-layer composite membrane of claim 1, wherein an average BET surface area of the single-layer composite membrane ranges from about 4 $m^2/g$ to about 9 $m^2/g$.

9. The single-layer composite membrane of claim 1, having an average permeation rate of greater than 18.62 $L/m^2$-hr when filtering the 1000 ppm NaCl solution in the pressurized water cell at 24 bars at room temperature.

10. The single-layer composite membrane of claim 1, wherein the MWCNTs comprise closed-ended carbon nanotubes.

11. The single-layer composite membrane of claim 1, wherein the MWCNTs are double-walled carbon nanotubes.

12. A method for producing the single-layer composite membrane of claim 1, the method comprising:
    (i) coating a surface with a film of a polymer solution comprising the polymeric matrix and the MWCNTs dissolved in at least one solvent, to obtain a coated surface;
    (ii) immersing the coated surface in a non-solvent to effect solvent/non-solvent demixing resulting in phase inversion to form a MWCNT-containing membrane; and
    (iii) optionally, removing the MWCNT-containing membrane from the surface.

13. A desalination method, comprising applying an ion-containing liquid to the single-layer composite membrane of claim 1 at an elevated pressure, such that water within the ion-containing liquid passes through the composite membrane with an average permeation rate of greater than 18.62 $L/m^2$-hr and ions within the ion-containing liquid are retained with the average salt-retention rate.

* * * * *